United States Patent
Hu et al.

(10) Patent No.: US 12,324,035 B2
(45) Date of Patent: Jun. 3, 2025

(54) CONNECTION MANAGEMENT IN MULTI-HOP NETWORKS

(71) Applicant: Telefonaktiebolaget LM Ericsson (publ), Stockholm (SE)

(72) Inventors: Liang Hu, San Diego, CA (US); Zhang Zhang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 405 days.

(21) Appl. No.: 17/795,965

(22) PCT Filed: Jan. 31, 2020

(86) PCT No.: PCT/CN2020/074107
§ 371 (c)(1),
(2) Date: Jul. 28, 2022

(87) PCT Pub. No.: WO2021/151247
PCT Pub. Date: Aug. 5, 2021

(65) Prior Publication Data
US 2023/0113249 A1    Apr. 13, 2023

(51) Int. Cl.
*H04W 76/14*    (2018.01)
*H04W 40/22*    (2009.01)
*H04W 88/04*    (2009.01)

(52) U.S. Cl.
CPC .......... *H04W 76/14* (2018.02); *H04W 40/22* (2013.01); *H04W 88/04* (2013.01)

(58) Field of Classification Search
None
See application file for complete search history.

(56) References Cited

U.S. PATENT DOCUMENTS

2016/0212780 A1   7/2016  Stojanovski
2016/0270134 A1*  9/2016  Stojanovski .......... H04W 40/00
(Continued)

FOREIGN PATENT DOCUMENTS

CN    110602801 A    12/2019
WO    2018082541 A1   5/2018

OTHER PUBLICATIONS

International Search Report and Written Opinion of the International Searching Authority for PCT International Application No. PCT/CN2020/074107 dated Nov. 2, 2020.
(Continued)

*Primary Examiner* — Angela Nguyen
(74) *Attorney, Agent, or Firm* — Sage Patent Group

(57) ABSTRACT

A method of establishing connections between wireless devices in a multi-hop sidelink communication network. The method comprises, at a wireless device: receiving a communication request message from a source wireless device; relaying the communication request message over a sidelink; receiving, from a target wireless device that received the relayed communication request message, a communication acceptance response message over a sidelink to establish a communication link between the wireless device and target wireless device; and relaying the communication acceptance response message received from the target wireless device to the source wireless device to establish a multi-hop communication link between the source wireless device and the target wireless device.

23 Claims, 21 Drawing Sheets

(56) References Cited

U.S. PATENT DOCUMENTS

2020/0008173 A1\* 1/2020 Kim .................... H04W 76/10
2021/0274422 A1\* 9/2021 Norp .................... H04W 40/22

OTHER PUBLICATIONS

Intel Corporation, "Considerations on Sidelink Communication Enhancements for Wearable and IoT Use Cases," R1-1704706, 3GPP TSG RAN1 WG Meeting #88bis, Spokane, USA, Apr. 3-7, 2017, 7 pages.

\* cited by examiner

CONNECTION MANAGEMENT IN MULTI-HOP NETWORKS

CROSS REFERENCE TO RELATED APPLICATION

This application is a 35 U.S.C. § 371 national stage application of PCT International Application No. PCT/CN2020/074107 filed on Jan. 31, 2020, the disclosure and content of which is incorporated by reference herein in its entirety.

TECHNICAL FIELD

The present disclosure relates to connection management in multi-hop networks. In particular, some aspects relate to connection establishment and connection re-establishment within multi-hop networks.

BACKGROUND

Device-to-device (D2D) communication involves direct communication between a pair of devices that does not traverse a network node or core network, or more generally without traversing network infrastructures. Due to it's potential to reduce latency, increase throughput, operate without network coverage and improve power and/or spectral efficiency, various applications of D2D communication have been developed including, for example: public safety communications, vehicle-to-everything (V2X) communications, the internet-of-things (IoT), and wearable devices.

The Third Generation Partnership Project (3GPP) standardization for D2D communications was initiated in Release 12. Release 12 described Proximity Services (ProSe) sidelink communications using the Long Term Evolution (LTE), or 4G, radio access technology (RAT). FIG. 1 illustrates an example of a ProSe sidelink communication network. Wireless devices (e.g., user equipment (UEs)) 101 and 103 can communicate with a network node 105 (e.g. a base station, eNodeB or gNB) within the coverage area 107 provided by the network node. The wireless devices 101 and 103 communicate with the network node 105 over the Uu physical interface. The devices 101 and 103 can also communicate directly with each other over a physical interface referred to as a sidelink. In other words, devices 101 and 103 can communicate directly with each other over the sidelink, i.e. not via the network node 105.

In 3GPP Release 14, support for sidelink V2X communication was introduced to the specification. A V2X communication can refer to any combination of direct communication between vehicles, pedestrians and infrastructures. V2X communication may utilize network infrastructure when available, but may also support D2D connectivity when no network coverage is available through sidelink communications.

FIG. 2 shows an example of a communication network supporting V2X communications. Network node 201 provides a coverage area 203. Located within the coverage area 203 are wireless devices 205 and 207, and vehicles 209 and 211. Vehicle 213 is located outside the coverage area 203. The network node can communicate with wireless devices 205 and 207 over the Uu physical interface. In this example, the network node can further communicate with vehicles 209 and 211 through the Uu interface. Device 207 can also communicate directly with vehicles 209 and 211 over respective sidelinks. Further, vehicles 209 and 211 can further communicate directly with vehicle 213 through respective sidelinks.

SUMMARY

Current Releases for the 3GPP specifications relating to LTE and New Radio (NR), also referred to as 5G, support only 'one-hop' sidelink networks. That is, sidelink networks where direct communications between a pair of communication devices is not relayed through a third device. It is envisaged that enhancements to support multi-hop sidelink relays will be desirable. Such an enhancement could support and enhance multiple use cases, for example more advanced public safety communication use cases or advanced V2X applications.

The present disclosure is directed to protocols and procedures to facilitate the establishment of communication connections over a multi-hop sidelink networks. The present disclosure is also directed to protocols and procedures for recovering communication links in a multi-hop communication network. Such networks can include a wireless device to wireless device relay and/or a wireless device to network relay.

According to one aspect of the present disclosure there is provided a method of establishing connections between wireless devices in a multi-hop sidelink communication network. The network comprises, at a wireless device, receiving a communication request message from a source wireless device and relaying the communication request message. The method further comprises receiving, from a target wireless device that received the relayed communication request message, a communication acceptance response message over a sidelink to establish a communication link between the wireless device and target wireless device. The wireless device then relays the communication acceptance response message received from the target wireless device to the source wireless device to establish a multi-hop connection between the source wireless device and the target wireless device.

According to another aspect of the present disclosure there is provided a wireless device for establishing connections between wireless devices in a multi-hop sidelink communication network. The wireless device is configured to receive a communication request message from a source wireless device and relay the communication request message. The wireless device receives, from a target wireless device that received the relayed communication request message, a communication acceptance response message over a sidelink to establish a communication link between the wireless device and target wireless device. The wireless device then relays the communication acceptance response message received from the target wireless device to the source wireless device to establish a multi-hop connection between the source wireless device and the target wireless device.

According to another aspect of the present disclosure there is provided a method of establishing connections between wireless devices and a network node in a multi-hop sidelink communication network. The method comprises, at a wireless device: receiving a communication request message from a source wireless device and sending a connection establishment request message for the source wireless device to a network node over an established connection. The wireless device receives from the network node a connection establishment acceptance message for the source wireless device, and then sends a connection establishment acceptance message for the network node to the source wireless device over the sidelink to establish a multi-hop connection between the source wireless device and the network node via the wireless device.

According to another aspect of the present disclosure there is provided a wireless device for establishing connections between wireless devices and a network node in a multi-hop sidelink communication network. The wireless device is configured to receive a communication request message from a source wireless device over a sidelink, and send a connection establishment request message for the source wireless device to a network node over an established connection. The wireless devices is configured to receive from the network node a connection establishment acceptance message for the source wireless device; and send a connection establishment acceptance message for the network node to the source wireless device over the sidelink to establish a multi-hop connection between the source wireless device and the network node via the wireless device.

According to other aspects of the present disclosure there may be provided a wireless device comprising processing circuitry configured to execute instructions to cause the wireless device to perform the methods herein. There may be a provided a non-transitory computer-readable storage medium storing instructions that, when executed by processing circuitry of a wireless device, cause the wireless device to execute the methods herein.

BRIEF DESCRIPTION OF THE DRAWINGS

The invention may best be understood by referring to the following description and accompanying drawings that are used to illustrate particular embodiments of the invention. In the drawings.

DETAILED DESCRIPTION

Figure 1:
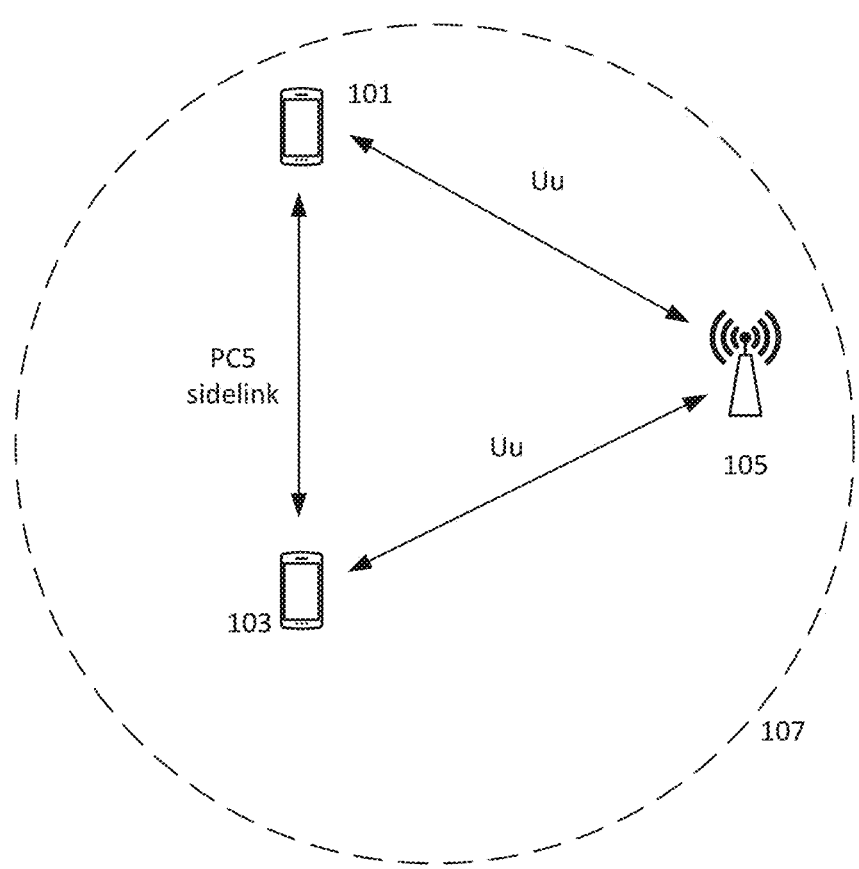
FIG. 1 illustrates an example of a communication network including a sidelink.
Figure 2:
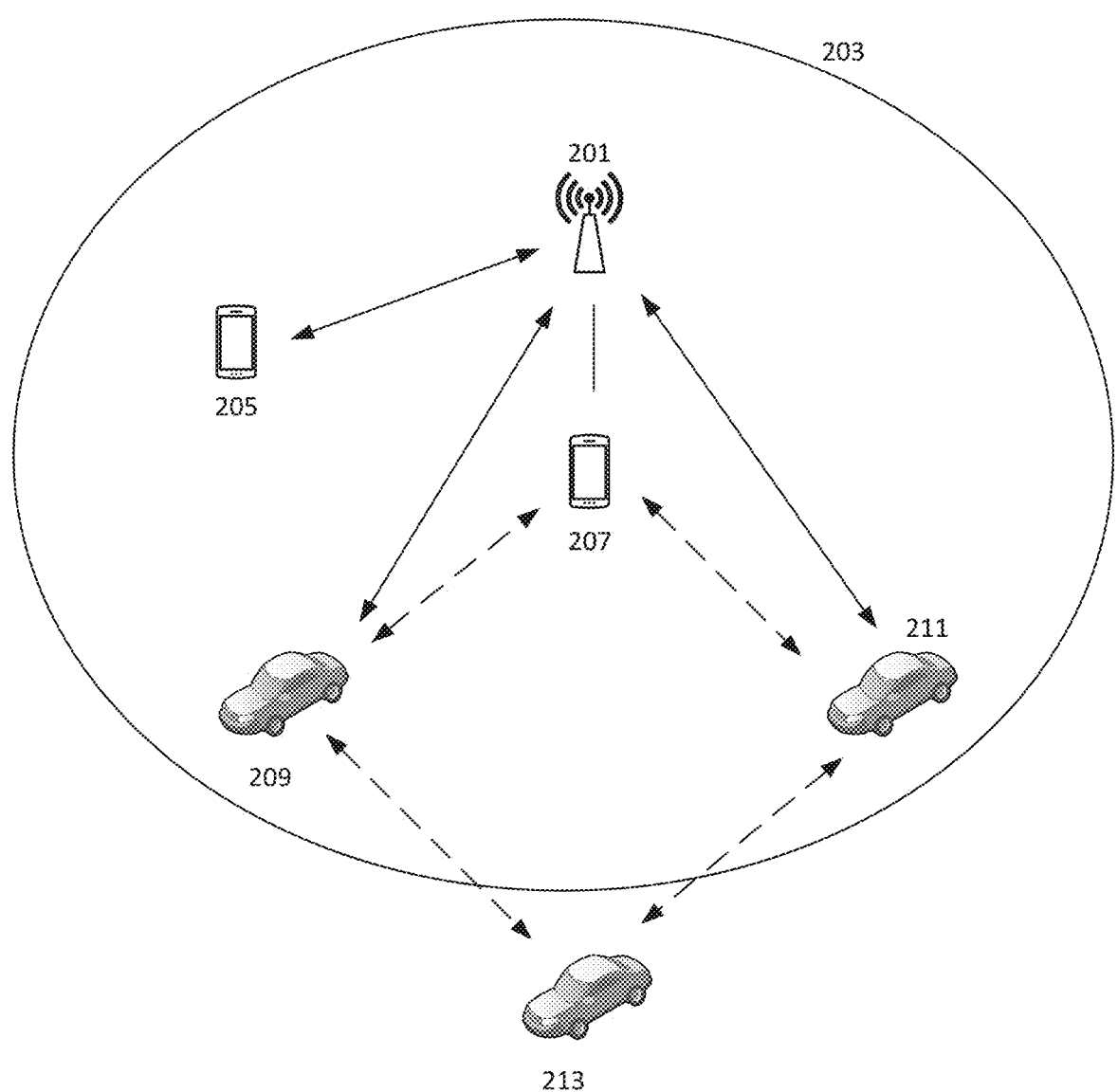
FIG. 2 illustrates an example of a communication network supporting V2X communications.

Before describing in detail exemplary embodiments, it is noted that components have been represented where appropriate by conventional symbols in the drawings, showing only those specific details that are pertinent to understanding the embodiments so as not to obscure the disclosure with details that will be readily apparent to those of ordinary skill in the art having the benefit of the description. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In some embodiments described herein, the term "coupled," "connected," and the like, may be used herein to indicate a connection, although not necessarily directly, and may include wired and/or wireless connections.

The term "network node" used herein can be any kind of network node forming part of a radio network and refer to a base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) or a network node.

The term "connection" may be used herein to refer to an end to end communication path. The end to end communication path may be between two wireless devices or between a wireless device and a network, or network node. The term "link" may be used herein to refer to a single hop communication path between two nodes. That is, a link may refer to a node to node direct communication path, i.e. a communication path between two nodes that doesn't pass through an intermediary node. A link may refer to a single hop between two wireless devices or between a wireless device and a network node. Thus, a connection may comprise multiple links.

The term "communication device" herein can be any type of device capable of communicating with a network node or another communication device over radio signals. The communication device might be a wireless device (WD) such as a radio communication device, target device, a user equipment (UE), a device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc. The communication device might be a vehicle capable of supporting V2X communications.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this may not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information.

It may in particular be considered that control signaling as described herein, based on the utilized resource sequence, implicitly indicates the control signaling type.

It may be considered for cellular communication there is provided at least one uplink (UL) connection and/or channel and/or carrier and at least one downlink (DL) connection and/or channel and/or carrier, e.g., via and/or defining a cell, which may be provided by a network node, in particular a base station, gNB or eNodeB. An uplink direction may refer to a data transfer direction from a terminal/wireless device to a network node, e.g., base station and/or relay station. A downlink direction may refer to a data transfer direction from a network node, e.g., base station and/or relay node, to a terminal/wireless device. UL and DL may be associated to different frequency resources, e.g., carriers and/or spectral bands. A cell may comprise at least one uplink carrier and at least one downlink carrier, which may have different frequency bands. A network node, e.g., a base station, gNB or eNodeB, may be adapted to provide and/or define and/or control one or more cells.

Generally, configuring may include determining configuration data representing the configuration and providing, e.g. transmitting, it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Figure 3:
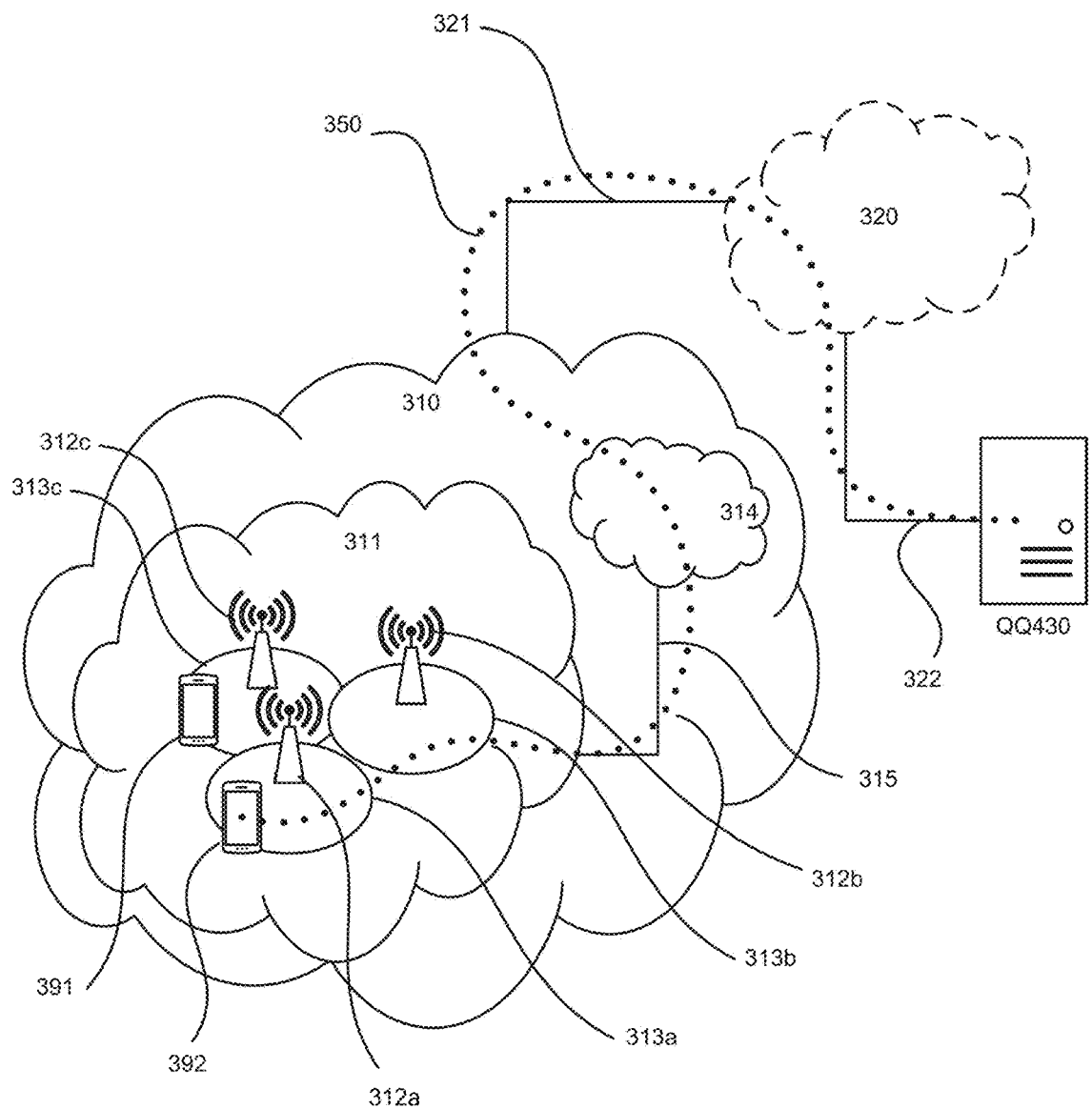
FIG. 3 illustrates an example of a communication network in which embodiments of the present disclosure can be implemented.

FIG. 3 shows an example communication system that includes a telecommunication network 310, such as a 3GPP-type cellular network that may support standards such as 4G (LTE) and/or 5G (NR), which comprises an access network 311, such as a radio access network, and a core network 314. The access network 311 comprises a plurality of network nodes 312a, 312b, 312c. In this example, the network nodes are base stations such as NBs, eNBs, gNBs or other types of wireless access points, each defining a corresponding coverage area 313a, 313b, 313c. Each base station 312a, 312b, 312c is connectable to the core network 314 over a wired or wireless connection 315. A first wireless device 391 located in coverage area 313c is configured to wirelessly connect to, or be paged by, the corresponding base station 312c. A second wireless device 392 in coverage area 313a is wirelessly connectable to the corresponding base station 312a. While a plurality of wireless devices 391, 392 are illustrated in this example, the disclosed embodiments are equally applicable to a situation where a sole wireless is in the coverage area or where a sole wireless is connecting to the corresponding base station 312. In this example, the wireless devices are UEs.

The telecommunication network 310 is itself connected to a host computer 330, which may be embodied in the hardware and/or software of a standalone server, a cloud-implemented server, a distributed server or as processing resources in a server farm. The host computer 330 may be under the ownership or control of a service provider, or may be operated by the service provider or on behalf of the service provider. The connections 321, 322 between the telecommunication network 310 and the host computer 330 may extend directly from the core network 314 to the host computer 330 or may go via an optional intermediate network 320. The intermediate network 320 may be one of, or a combination of more than one of, a public, private or hosted network; the intermediate network 320, if any, may be a backbone network or the Internet; in particular, the intermediate network 320 may comprise two or more sub-networks (not shown).

The communication system of FIG. 3 as a whole enables connectivity between one of the connected UEs 391, 392 and the host computer 330. The connectivity may be described as an over-the-top (OTT) connection 350. The host computer 330 and the connected UEs 391, 392 are configured to communicate data and/or signaling via the OTT connection 350, using the access network 311, the core network 314, any intermediate network 320 and possible further infrastructure (not shown) as intermediaries. The OTT connection 350 may be transparent in the sense that the participating communication devices through which the OTT connection 350 passes are unaware of routing of uplink and downlink communications. For example, a base station 312 may not or need not be informed about the past routing of an incoming downlink communication with data originating from a host computer 330 to be forwarded (e.g., handed over) to a connected UE 391. Similarly, the base station 312 need not be aware of the future routing of an outgoing uplink communication originating from the UE 391 towards the host computer 330.

Example implementations of a wireless device, network node and host computer discussed in the preceding paragraphs will now be described with reference to FIG. 4. In a communication system 400, host computer 330 comprises hardware 415 including a communication interface 416 configured to set up and maintain a wired or wireless connection with an interface of a different communication device of the communication system 400. The host computer 330 further comprises processing circuitry 418, which may have storage and/or processing capabilities. In particular, the processing circuitry 418 may comprise one or more programmable processors, application-specific integrated circuits, field programmable gate arrays or combinations of these (not shown) adapted to execute instructions. The host computer 330 further comprises software 411, which is stored in or accessible by the host computer 330 and executable by the processing circuitry 418. The software 411 includes a host application 412. The host application 412 may be operable to provide a service to a remote user, such as a UE 392 connecting via an OTT connection 450 terminating at the UE 392 and the host computer 330. In providing the service to the remote user, the host application 412 may provide user data which is transmitted using the OTT connection 450.

The communication system 400 further includes a network node (e.g. base station 312a) 420 provided in a telecommunication system and comprising hardware 425 enabling it to communicate with the host computer 330 and with the UE 392. The hardware 425 may include a communication interface 426 for setting up and maintaining a wired or wireless connection with an interface of a different communication device of the communication system 400, as well as a radio interface 427 for setting up and maintaining at least a wireless connection 470 with a UE 392 located in a coverage area (not shown in FIG. 4) served by the base station 312a. The communication interface 426 may be configured to facilitate a connection 460 to the host computer 410. The connection 460 may be direct or it may pass through a core network (not shown in FIG. 4) of the telecommunication system and/or through one or more intermediate networks outside the telecommunication system. In the embodiment shown, the hardware 425 of the base station 312a further includes processing circuitry 428, which may comprise one or more programmable processors, application-specific integrated circuits, field programmable gate arrays or combinations of these (not shown) adapted to execute instructions stored in non-transitory form in memory 429. The processing circuitry 428 can execute instructions stored in the memory 429 to cause the network node 312a to perform any or the relevant parts of the associated methods disclosed herein, for example those described with reference to FIGS. 9 and 11 to 13 below. The network node 620 further has software 621 stored internally or accessible via an external connection. The base station 312a further has software 421 stored internally or accessible via an external connection.

The communication system 400 further includes the UE 392 already referred to. Its hardware 435 may include a radio interface 437 configured to set up and maintain a wireless connection 470 with a base station serving a coverage area when the UE 392 is located within that coverage area. The hardware 435 of the UE 392 further includes processing circuitry 438, which may comprise one or more programmable processors, application-specific integrated circuits, field programmable gate arrays or combinations of these (not shown) adapted to execute instructions stored in non-transitory form in memory 439. The processing circuitry 438 can execute instructions stored in the memory 439 to cause the wireless device 392 to perform any or the relevant parts of the associated methods disclosed herein, for example those described with reference to FIGS. 8, 10, 14 and 18. The UE 392 further comprises software 431, which is stored in or accessible by the UE 392 and executable by the processing circuitry 438. The software 431 includes a client application 432. The client application 432 may be operable to provide a service to a human or non-human user via the UE 392, with the support of the host computer 330. In the host computer 330, an executing host application 412 may communicate with the executing client application 432 via the OTT connection 450 terminating at the UE 392 and the host computer 330. In providing the service to the user, the client application 432 may receive request data from the host application 330 and provide user data in response to the request data. The OTT connection 450 may transfer both the request data and the user data. The client application 432 may interact with the user to generate the user data that it provides.

Figure 4:
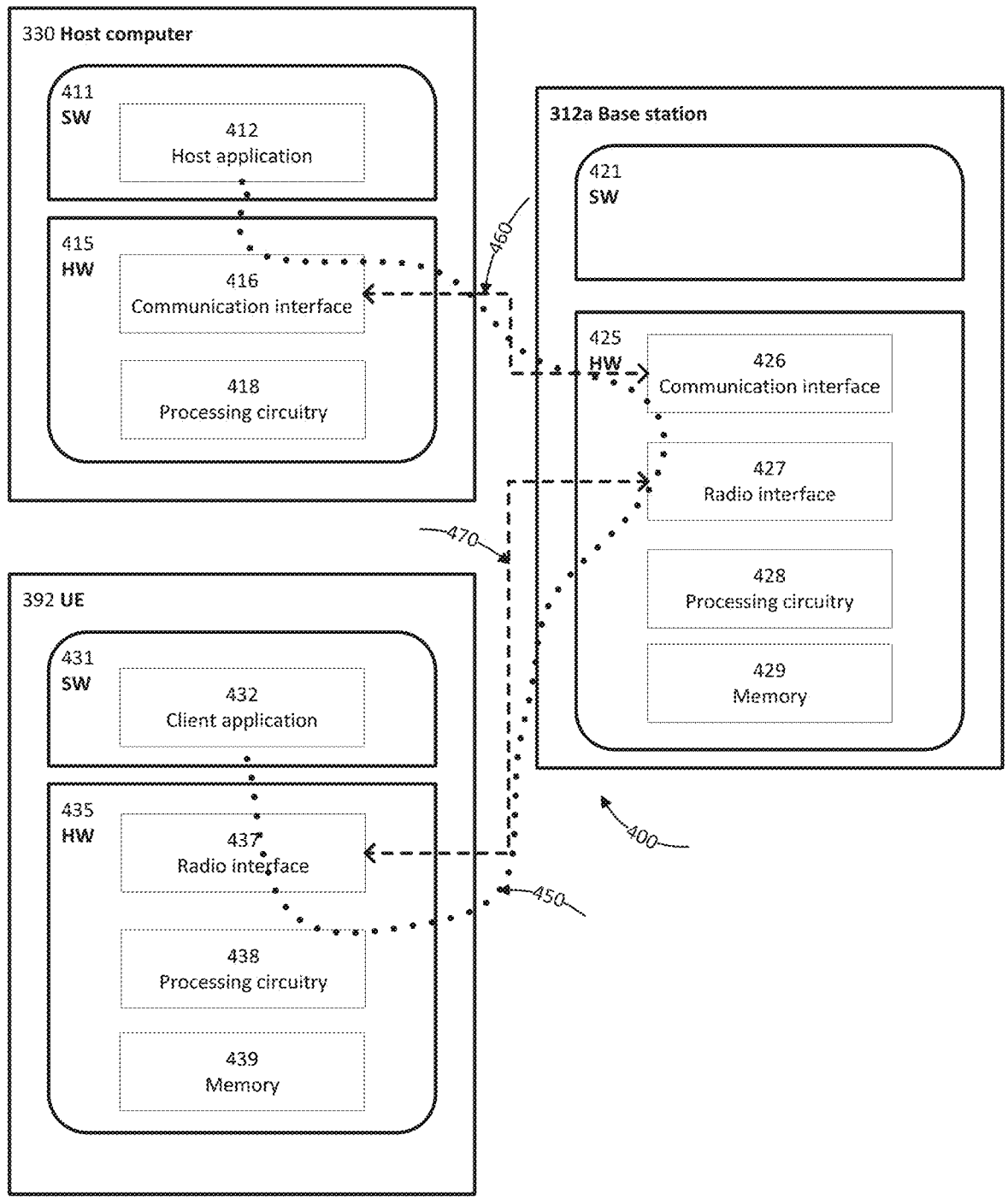
FIG. 4 illustrates certain components of the network shown in FIG. 3 in more detail.

It is noted that although only one network node and wireless device are illustrated in FIG. 4, any one or more of the other wireless devices and base stations of FIG. 4 may be similar to the wireless device and base station of FIG. 4. This is to say, the inner workings of these entities may be as shown in FIG. 4 and independently, the surrounding network topology may be that of FIG. 3.

In FIG. 4, the OTT connection 450 has been drawn abstractly to illustrate the communication between the host computer 330 and the user equipment 392 via the base station 312a, without explicit reference to any intermediary devices and the precise routing of messages via these devices. Network infrastructure may determine the routing, which it may be configured to hide from the UE 392 or from the service provider operating the host computer 330, or both. While the OTT connection 450 is active, the network infrastructure may further take decisions by which it dynamically changes the routing (e.g., on the basis of load balancing consideration or reconfiguration of the network).

The wireless connection 470 between the UE 392 and the base station 312a is in accordance with the teachings of the embodiments described throughout this disclosure. One or more of the various embodiments improve the performance of OTT services provided to the UE 392 using the OTT connection 450, in which the wireless connection 470 forms a segment.

A measurement procedure may be provided for the purpose of monitoring data rate, latency and other factors on which the one or more embodiments improve. There may further be an optional network functionality for reconfiguring the OTT connection 450 between the host computer 330 and UE 392, in response to variations in the measurement results. The measurement procedure and/or the network functionality for reconfiguring the OTT connection 450 may be implemented in the software 411 of the host computer 330 or in the software 431 of the UE 392, or both. In embodiments, sensors (not shown) may be deployed in or in association with communication devices through which the OTT connection 450 passes; the sensors may participate in the measurement procedure by supplying values of the monitored quantities exemplified above, or supplying values of other physical quantities from which software 411, 431 may compute or estimate the monitored quantities. The reconfiguring of the OTT connection 450 may include message format, retransmission settings, preferred routing etc.; the reconfiguring need not affect the base station 312a, and it may be unknown or imperceptible to the base station 312a. Such procedures and functionalities may be known and practiced in the art. In certain embodiments, measurements may involve proprietary UE signaling facilitating the host computer's 330 measurements of throughput, propagation times, latency and the like. The measurements may be implemented in that the software 411, 431 causes messages to be transmitted, in particular empty or 'dummy' messages, using the OTT connection 450 while it monitors propagation times, errors etc.

Figure 19:
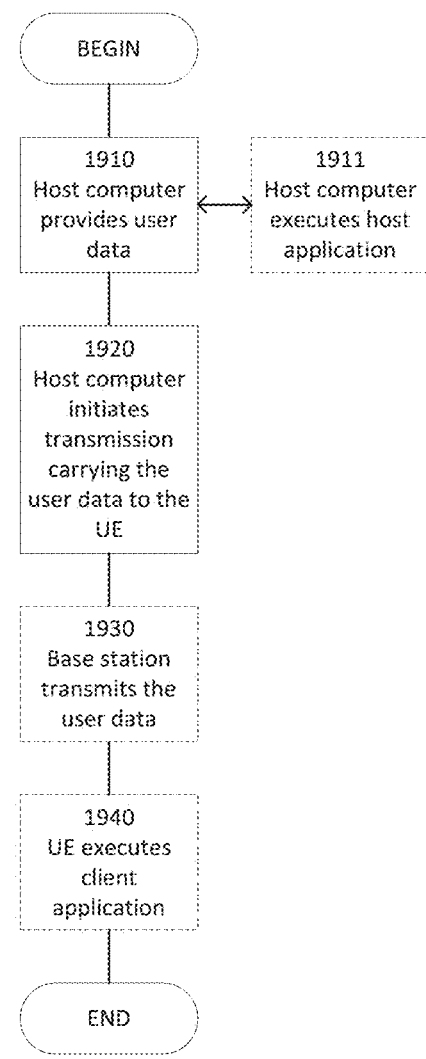
FIG. 19 is a flowchart illustrating methods implemented in a communication system including a host computer, a base station and a user equipment.

FIG. 19 is a flowchart illustrating a method implemented in a communication system, in accordance with one embodiment. The communication system includes a host computer, a base station and a UE which may be those described with reference to FIGS. 3 and 4. For simplicity of the present disclosure, only drawing references to FIG. 19 will be included in this section. In a first step 1910 of the method, the host computer provides user data. In an optional substep 1911 of the first step 1910, the host computer provides the user data by executing a host application. In a second step 1920, the host computer initiates a transmission carrying the user data to the UE. In an optional third step 1930, the base station transmits to the UE the user data which was carried in the transmission that the host computer initiated, in accordance with the teachings of the embodiments described throughout this disclosure. In an optional fourth step 1940, the UE executes a client application associated with the host application executed by the host computer.

Figure 20:
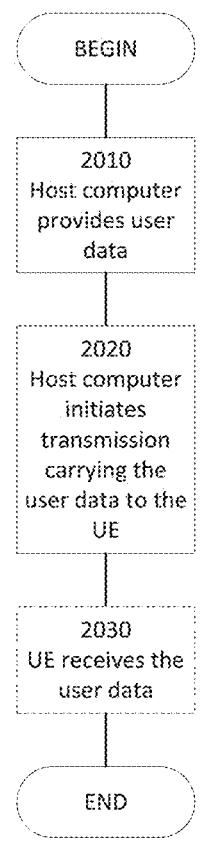
FIG. 20 is a further flowchart illustrating methods implemented in a communication system including a host computer, a base station and a user equipment.

FIG. 20 is a flowchart illustrating a method implemented in a communication system, in accordance with one embodiment. The communication system includes a host computer, a base station and a UE which may be those described with reference to FIGS. 3 and 4. For simplicity of the present disclosure, only drawing references to FIG. 20 will be included in this section. In a first step 2010 of the method, the host computer provides user data. In an optional substep (not shown) the host computer provides the user data by executing a host application. In a second step 2020, the host computer initiates a transmission carrying the user data to the UE. The transmission may pass via the base station, in accordance with the teachings of the embodiments described throughout this disclosure. In an optional third step 2030, the UE receives the user data carried in the transmission.

Figure 21:
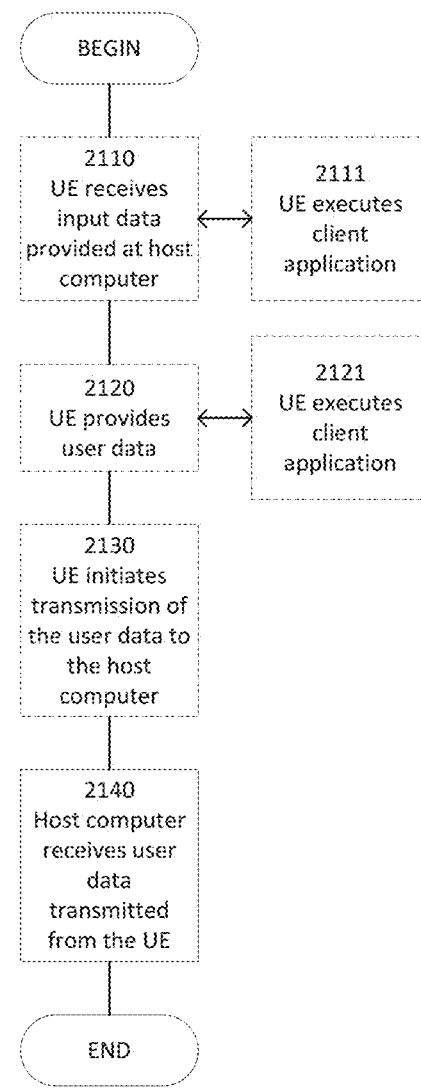
FIG. 21 is a further flowchart illustrating methods implemented in a communication system including a host computer, a base station and a user equipment.

FIG. 21 is a flowchart illustrating a method implemented in a communication system, in accordance with one embodiment. The communication system includes a host computer, a base station and a UE which may be those described with reference to FIGS. 3 and 4. For simplicity of the present disclosure, only drawing references to FIG. 21 will be included in this section. In an optional first step 2110 of the method, the UE receives input data provided by the host computer. Additionally or alternatively, in an optional second step 2120, the UE provides user data. In an optional substep 2121 of the second step 2120, the UE provides the user data by executing a client application. In a further optional substep 2111 of the first step 2110, the UE executes a client application which provides the user data in reaction to the received input data provided by the host computer. In providing the user data, the executed client application may further consider user input received from the user. Regardless of the specific manner in which the user data was provided, the UE initiates, in an optional third substep 2130, transmission of the user data to the host computer. In a fourth step 2140 of the method, the host computer receives the user data transmitted from the UE, in accordance with the teachings of the embodiments described throughout this disclosure.

Figure 22:
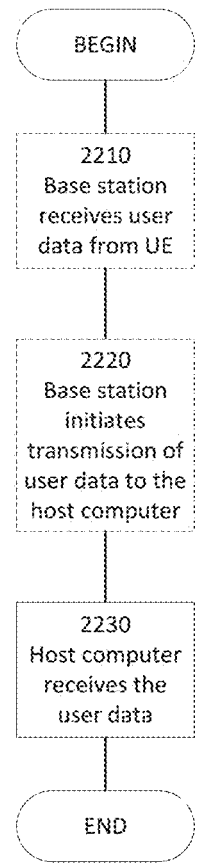
FIG. 22 is a further flowchart illustrating methods implemented in a communication system including a host computer, a base station and a user equipment.

FIG. 22 is a flowchart illustrating a method implemented in a communication system, in accordance with one embodiment. The communication system includes a host computer, a base station and a UE which may be those described with reference to FIGS. 3 and 4. For simplicity of the present disclosure, only drawing references to FIG. 22 will be included in this section. In an optional first step 2210 of the method, in accordance with the teachings of the embodiments described throughout this disclosure, the base station receives user data from the UE. In an optional second step 2220, the base station initiates transmission of the received user data to the host computer. In a third step 2230, the host computer receives the user data carried in the transmission initiated by the base station.

Link Establishment

Figure 5:
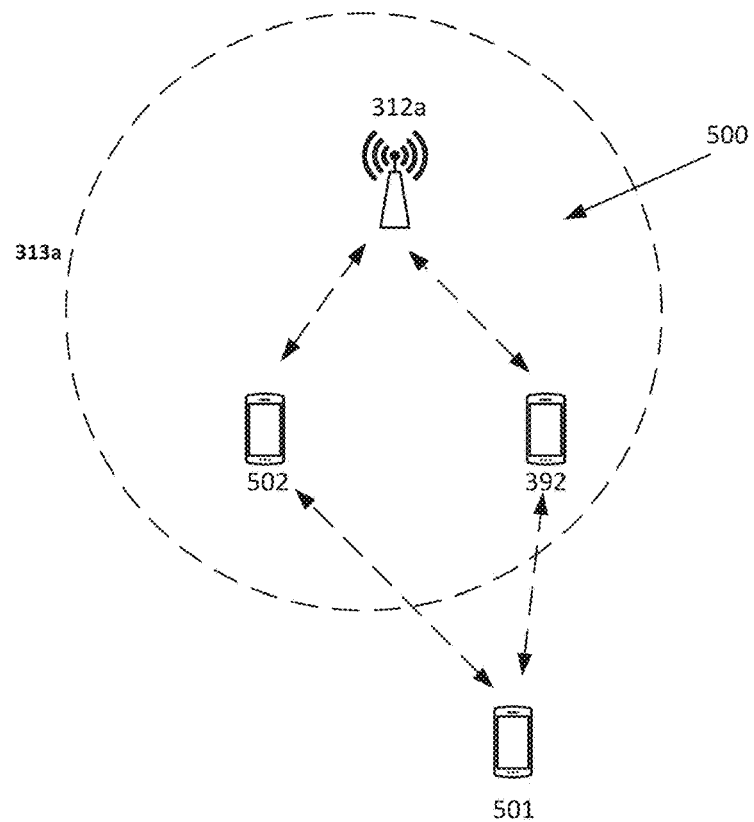
FIG. 5 illustrates an example multi-hop sidelink relay within partial cellular network coverage.

Example processes and protocols for establishing communication links over a multi-hop sidelink network will now be described. Before this is explained in detail, reference is made to FIGS. 5 and 6. FIG. 5 illustrates an example multi-hop sidelink network 500 including a wireless device to network relay. The multi-hop sidelink network comprises a network node, which in this example is base station 312a. It further comprises a wireless device in the form of UE 392, and additional wireless devices in the form of UEs 501 and 502. The multi-hop sidelink network is partially within the cellular network coverage 313a provided by network node 312a. More specifically, UEs 392 and 502 are within the coverage area of the network node 312a, i.e. are within communication range of the network node 312a. UE 501 is outside the coverage area of network node 312a, and thus cannot communicate with the network node over the Uu interface.

Figure 6:
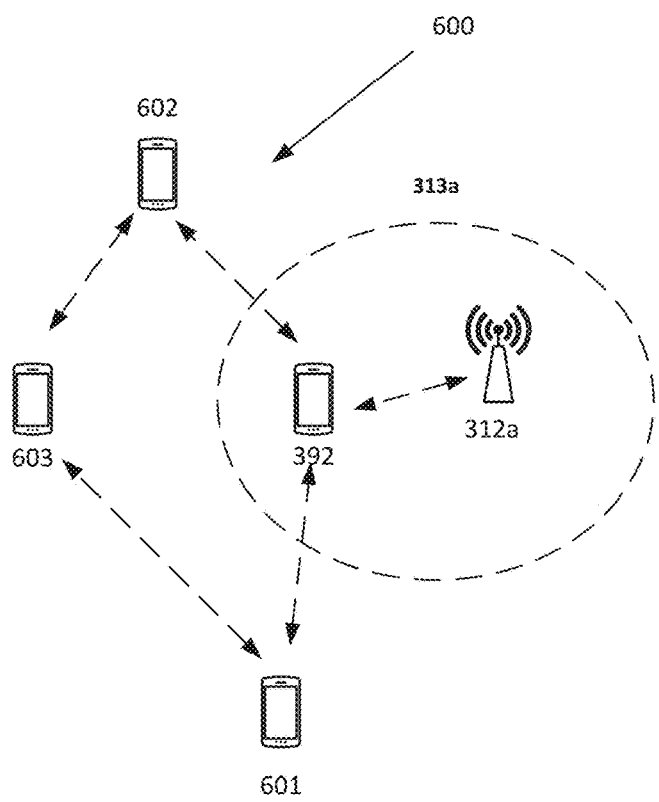
FIG. 6 illustrates an example multi-hop sidelink with partial cellular network coverage.

FIG. 6 illustrates an example of a multi-hop sidelink network 600 including a wireless device to wireless device network relay and a wireless device to network node relay. The network 600 includes a network node in the form of base station 312a. It further includes a wireless device in the form of UE 392, and further wireless devices in the form of UEs 601, 602 and 603. In the example shown here, only UE 392 is located within the coverage area of the network node 312a. In other words, UE 392 is in communication range of the network node 312a and so can communicate with the network node over the Uu interface. A wireless device to wireless device relay can therefore be formed between UE 601 and UE 602 via UE 392, and a wireless device to network node relay can be formed between UE 601 and network node 312a via UE 392. As will be explained in more detail below, UE 392 may therefore in some examples be capable of performing a device to device relay and a device to network relay.

Figure 7:
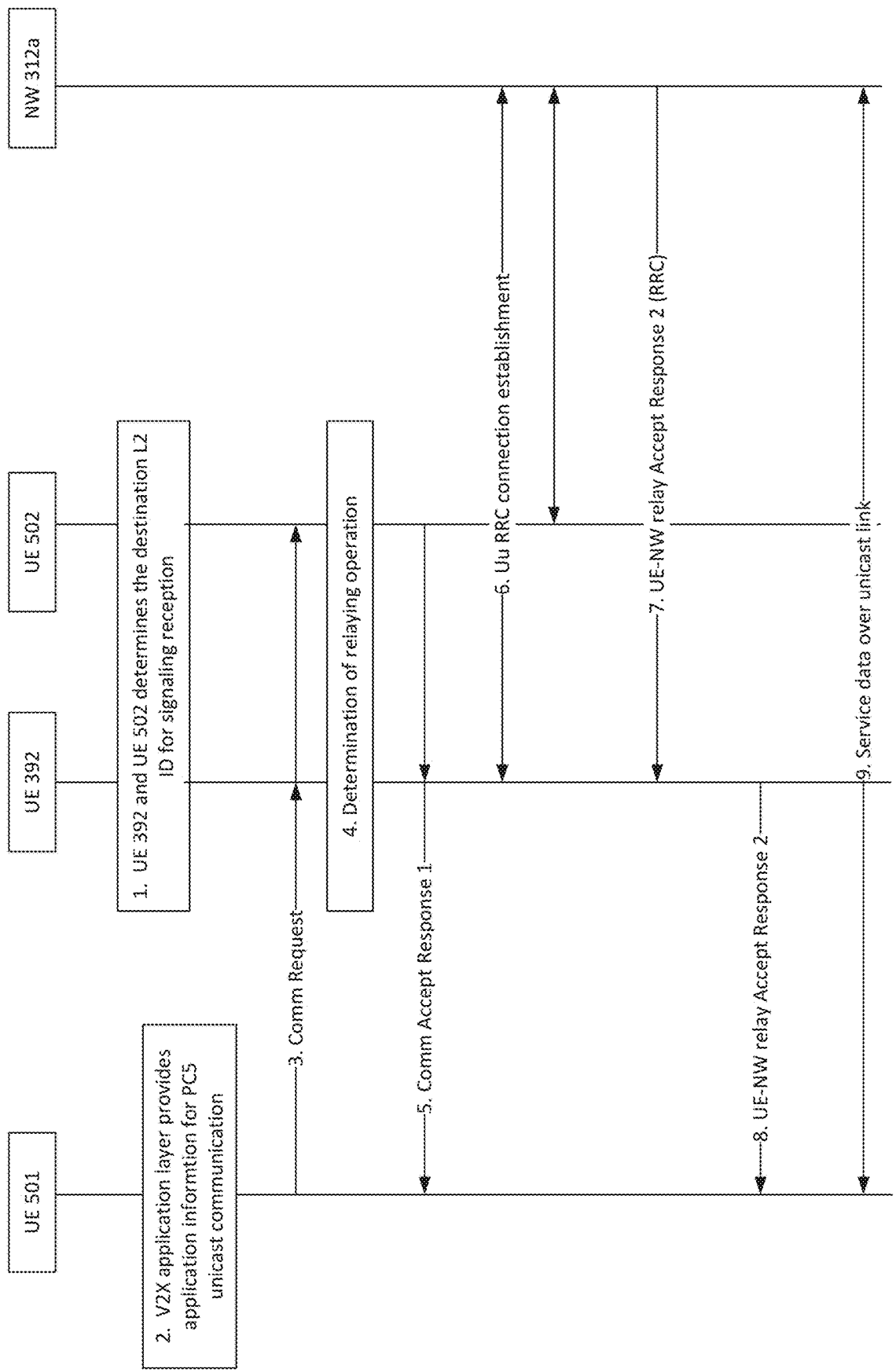
FIG. 7 illustrates an example connection establishment procedure for a multi-hop wireless-device to network sidelink relay.

FIG. 7 illustrates an example process for establishing a communication links between wireless devices of a multi-hop sidelink network. In this example, the sidelink network is the network 500 illustrated in FIG. 5. The process illustrated is for the establishment of unicast connections between UE 501 and network node 312a through the wireless device to network node sidelink relay. UE 501 might therefore be referred to as a source device, or remote device. UEs 392 and 502 might be referred to as relay devices.

At step 1, UEs 392 and 502 determine the destination ID which may be an ID in layer-2 for signaling reception where the signaling may be used for connection establishment. The connection to be established is in this example a unicast connection consisting of multiple links, which include both D2D link(s) and cellular link(s). The D2D link may be a PC5 link. The destination ID is configured with the UEs. The destination node with which UE 501 will communicate with is in this example the network node 312a.

At step 2, the application layer in UE 501 provides application information for the unicast communication. The application information includes the service type(s) (e.g. Provider Service Identifier (PSID) or Intelligent Transport Systems Application Identifier (ITS-AID) as specified in the 3GPP specifications) of the application and the initiating UE's 501 Application Layer ID. The application layer might in some implementations be a V2X application layer. The application layer in UE 501 may provide (V2X) Application Requirements for this unicast communication. The UE 501 might also determine the Quality of Service (QoS) parameters and Packet Flow Identifier (PFI).

At step 3, UE 501 sends a Communication Request message to its neighbouring UEs (in this example, UEs 392 and 502). The UE 501 may broadcast the Communication Request message. The Communication Request message is sent from UE 501 to initiate the unicast connection establishment procedure. The Communication Request message might include the following information:
Source User Info: the initiating UE's 501 Application Layer ID.
Indication whether IP communication is used.
IP Address Configuration
QoS Info: the information about PC5 QoS Flow(s). For each PC5 QoS Flow, the PFI and the corresponding PC5 QoS parameters (i.e. packet QoS Identification (PQI) and conditionally other parameters such as MFBR/GFBR, etc).

The Communication Request message might comprise one or more pieces of the following additional information, or indications of one or more of the following bits of information:
Capability and/or allowance/request information of the device to device (e.g. PC5) communication over more than one hop. In other words, an indication of a capability or allowance or request for a multi-hop communication from the source device. Optionally this information is given separately for UE to UE relay and UE to NW relay.
Optionally, an indication on whether the targeted communication to be established needs to go through the Uu interface or just the PC5 interface. Wireless device to network node relaying is needed in the former case while a wireless device to wireless device relaying is needed in the latter case. In this example, the Communication Request message includes an indication the targeted communication is to go through the Uu interface.
The targeted service range or the targeted service area. The targeted service area is an area where the targeted service for the requested communication is expected/needed or the targeted UE(s) are located in.
List of ID of UE(s) that are (temporally) excluded for relaying, in case e.g. the UE(s) cannot provide the required QoS (for communication over more than one hop). That is, the IDs of UEs that are not to be used for relaying communications over the multi-hop sidelink network. The information identifying the excluded UEs could be known in advance, e.g. from previous communications with those UE(s). Optionally, the IDs for the excluded UEs are given separately for UE to UE relay and UE to network node relay.

The Communication Request message is in this example received by UEs 392 and 502. When the UEs 392 502 receive the Communication Request message, they determine at step 4 whether to perform communication relaying over the multi-hop sidelink network. The UEs may make this determination using the received Communication Request message. The determination may further be made based on the local conditions for the UEs, for example: traffic load, the Uu and/or device to device (e.g. PC5) link quality, moving speed of the UE, its available power etc. The UEs may first determine whether multi-hop relaying is permissible or requested or supported, using the contents of the Communication Request message. If it's determined relaying is permissible/requested/supported, the UE may further determine whether device-to-device relaying or device to network node relaying is to be performed. This determination could be based on:
indications provided for device-to-device relay and device to network node relay respectively. The indications for each type of relay could take the form of an indication that type of relay is supported or allowed or requested.
indications on which physical interface the targeted service, or the communication requested by the source device, is required to be sent through (for example the device-to-device interface or Uu interface).
Service information (e.g. V2X Service Information) in the Communication Request.
Based the location situation for the UE.
If an exclusion list of UEs for relaying is provided, the UEs 392 and 502 further check whether they are included in the list. That is, the UEs 392 and 502 check whether they are excluded from relaying messages over the multi-hop network. The UE(s) will not perform relaying if they determine they are identified on the exclusion list. This may be checked for a device to device relay and device to network node relay separately. In other words, the UEs 392 and 502 can separately determine whether they are permitted to perform device to device relaying and device to network node relaying.

In this example, both UEs 392 and 502 determine they are capable of performing device to network relaying. At step 5, the UEs 392 and 502 may optionally send a Communication Accept Response message to UE 501. By sending this message, a respective communication link between the source UE 501 and the UEs 392 and 502 may be established. The Communication Accept Response message may be sent over respective sidelinks between the UEs 392, 502 and UE 501. It may be sent by unicast transmission. A UE may send the Communication Accept Response message in response to receiving a Communication Request in the following circumstances:

When the UE is interested in the service included in the received Communication Request message.
When the UE is the targeted UE included in the received Communication Request message.
When the UE determines it will/could perform relaying. In this case the Response message may additionally indicate whether a device to device and/or device to network relay (or just a relay) will/could be performed.

In this example, the UEs 392 and 502 send the Communication Accept Response message before receiving a response message from the network node (shown at step 7). This enables the device to device communication link to be established between the source UE 501 and the relay UEs 392, 501 in advance, i.e. before a response is received from the network node. In other examples, the UEs 392 and 501 might delay sending the Communication Accept Response message to UE 501 until a response message is received from the network node, i.e. after step 7, or alternatively, the UEs 392 and/or 502 send two Communication Accept Response messages at step 3 and step 8 respectively, while the device to device communication link between the source UE 501 and the relay UEs 392 or 501 is established after the second Communication Accept Response message is sent.

At step 6, the UEs 392 and 502, having determined that they are to perform wireless device to network node relaying at step 4, trigger connection establishment with the network node 312a. The connection to be established with the network node might be an RRC connection. It might be a Uu RRC connection—i.e., a connection over the Uu interface—for example an NR Uu RRC connection. The UEs may perform this step if they are not currently connected to the network node 312a, for example because they are in an RRC idle/inactive/low powered mode. After triggering establishment of the connection, the UEs send to the network node a "remote UE connection establishment request" using e.g. RRC signaling. In case the network node 312a receives more than one such request for the same remote UE from different relay UEs (e.g. from both UE 392 and UE 502), the network node 312a may determine over which relay UE the connection to the remote UE 501 should be established. The network node 312a may further forward information about the (selected) relay UE (e.g. UE 392 in this example) together with the radio/traffic situation at the network node and/or selected relay UE to an upper layer node, e.g. access and mobility management function (AMF). The upper layer node may confirm and/or make another determination over which relay UE the connection to the remote UE 501 should be established, and send the determination results to the network nodes that forwarded the (selected) relay UE information. In this example, UE 392 is selected as the relay node.

At step 7, the relay node 392 receives a Device-to-network node relay Accept Response message from the network node 312a. The accept response message can be sent to the UE 392 via RRC signaling. The network node 312a can send the Accept Response message in the following situations:

The network node 312a itself has accepted the requested communication from the remote UE 501 and selected a relay UE (UE 392) over which the connection to the remote UE 501 should be established. Or:
The network node 312a itself has accepted the requested communication from the remote UE 501 and received confirmation/determination results from an upper layer node on the selected relay UE 392 where the relay UE is served by the network node 312a and it's determined the connection to the remote UE 501 should be established via. the relay UE 392.

At step 8, the selected relay UE (UE 392) generates a connection establishment Accept Response message and sends it to the remote UE 501 over a sidelink. The UE 392 generates and sends the Accept Response message to the source UE 501 after it receives the device-to-network node relay Accept Response message from the network node 312a. By sending this message, a D2D link (e.g. PC5 link) is established between the relay UE 392 and the remote UE 501 (if not previously established at step 3), and the multi-hop end-to-end connection between the remote UE 501 and network node 312a could be established over the established per-hop links. Following establishment of the end-to-end multi-hop connection, service data can be sent and/or received between the UE 501 and network node 392 over the multi-hop device to network node sidelink relay (step 9).

Figure 8:
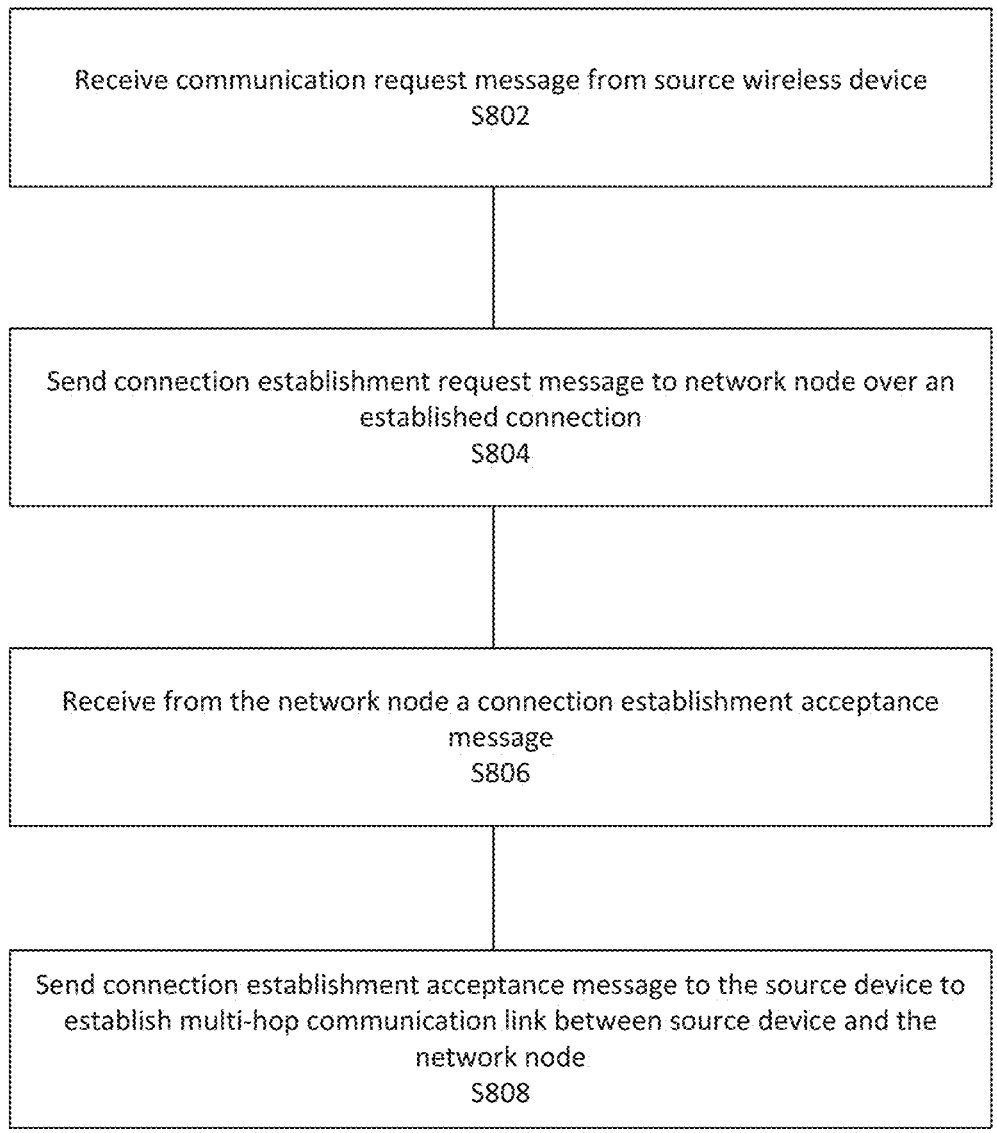
FIG. 8 is a flowchart of example steps performed by a wireless device in a connection establishment procedure for a wireless device to network sidelink relay.

FIG. 8 shows a flowchart summarizing steps performed by the relay UE 392 in establishing connections for a device-to-network node relay according to embodiments of the present disclosure.

At step 802, the UE 392 receives a Communication Request from a source, or remote, wireless device 501. The Communication Request may be sent via broadcast. This step corresponds to step 3 in FIG. 7.

At step 804, the UE 392 sends a Connection Establishment Request message for the source UE 501 to the network node 312a. This Request message is sent over an established connection to the network node 312a, for example an RRC connection. As explained above with respect to FIG. 7, the UE 392 might first trigger establishment of the connection to the network node 312a if it's in an idle or inactive mode. Establishment of the connection to the network node 312a might not be needed if the UE 392 is already in an active mode, for example an active RRC mode. As also explained above with reference to step 4 pf FIG. 7, the UE 392 might send the Connection Establishment Request message after determining from the received Communication Request message it is to perform relaying. Furthermore, the UE 392 might, in some examples, send a Communication Accept Response message to the source UE 501 prior to communicating with the network node 312a to establish the D2D communication link between the relay UE 392 and remote UE 501.

At step 806, the UE 392 receives from the network node 312a a Connection Establishment Acceptance message. This message might be received via RRC signaling. This step can correspond to step 7 in FIG. 7.

At step 808, the UE 392 generates a further Connection Establishment Acceptance message for the network node 312a and sends this to the source device 501. The Acceptance message sent to the UE 392 might be generated from the Acceptance message received from the network node at step 806. The Acceptance message sent to the UE 392 might be sent over a sidelink between the UE 392 and UE 501. Step 808 may in some examples correspond to step 8 in FIG. 7. By sending the Acceptance message to the UE 501, the end-end multi-hop connection between the remote UE 501 and the network node 312a is established.

Figure 9:
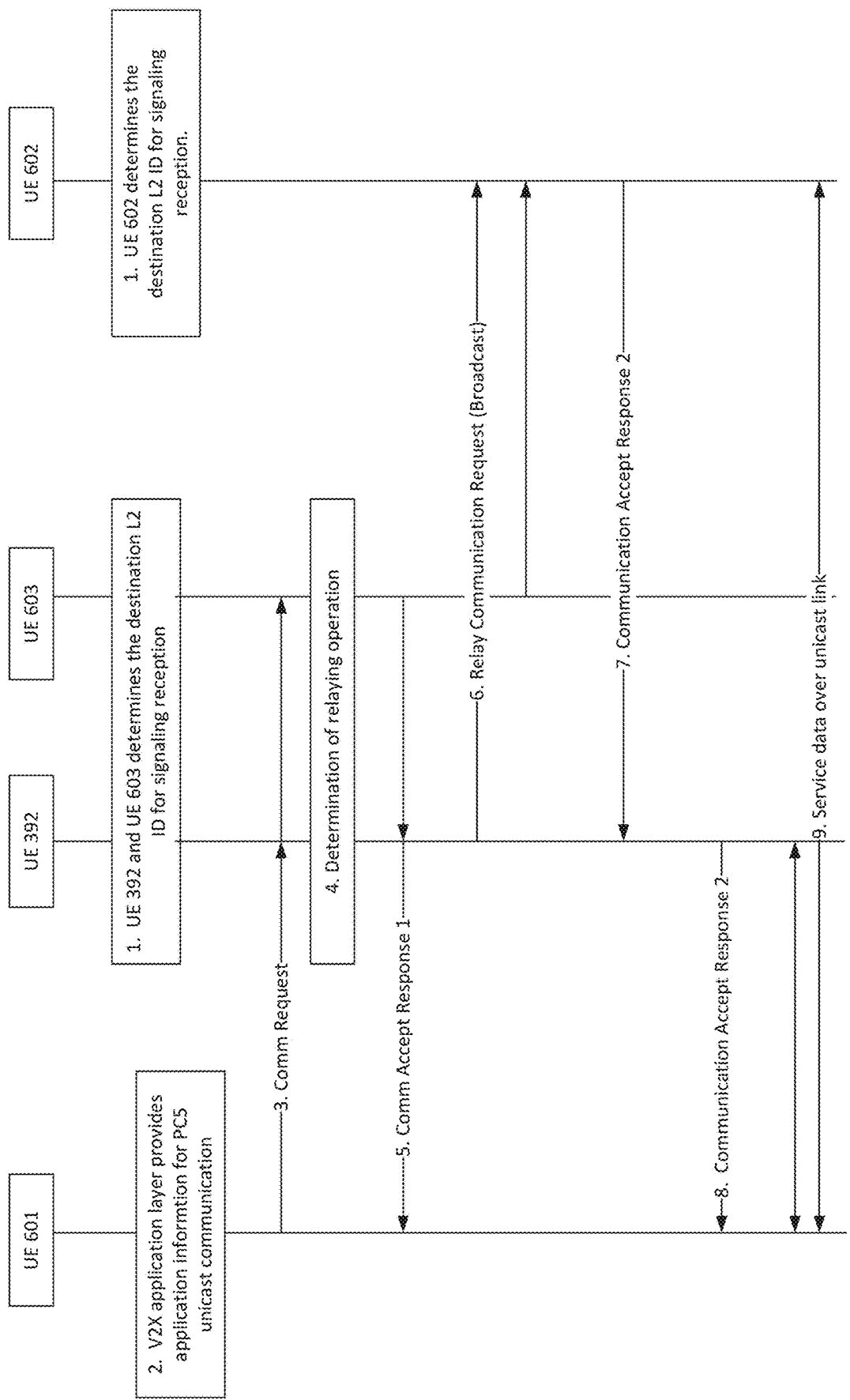
FIG. 9 illustrates an example connection establishment procedure for a multi-hop wireless-device to wireless device sidelink relay.

FIG. 9 illustrates an example process for establishing a sidelink connection between wireless devices of a multi-hop sidelink network. In this example, the sidelink network is the network 600 illustrated in FIG. 6. The process illustrated is for the establishment of unicast connections between UE 601 and UE 602 via. a device to device sidelink relay. UE 601 might therefore be referred to as a source device, or remote device. UEs 392 and 603 might be referred to as relay devices. UE 602 might be referred to as the target device.

Step 1 is similar to step 1 of FIG. 7. Here, UEs 392, 603 and 602 determine the destination ID for signaling reception, where the signaling may be used for connection establishment. The ID may be an ID in Layer-2. The connection to be established is a sidelink connection consisting of multiple D2D link(s) in this example. The D2D link may be a PC5 link. The destination ID is configured with the UEs. The destination node is in this example the target UE 602.

Step 2 is similar to step 2 of FIG. 7. The application layer in UE 601 provides application information for the unicast communication. The application information may include analogous information to what is described above with respect to Step 2 of FIG. 7. It might additionally include the target UE's 602 Application Layer ID.

Steps 3 and 4 are analogous to steps 3 and 4 described with respect to FIG. 7. In this example, the Communication Request message sent from UE 601 is not received by the target UE 602 because it is out of direct communication range of UE 601. Analogously to the case in FIG. 7, in this example it is assumed both UE 392 and UE 603 determine they are to perform communication relaying over a multi-hop sidelink network. In this example, the UEs determine they to perform device-to-device relaying.

At step 5, the UEs 392 and 603 may optionally send a Communication Accept Response message to UE 601. By sending this message, a respective communication link between the source UE 601 and the UEs 392 and 603 may be established. The Communication Accept Response message may be sent over respective sidelinks between the UEs 392, 603 and UE 601. It may be sent by unicast transmission. A UE may send the Communication Accept Response message in response to receiving a Communication Request from the source UE 601 in the following circumstances:

When the UE is interested in the service included in the received Communication Request message.

When the UE is the targeted UE included in the received Communication Request message.

When the UE determines it will/could perform relaying. In this case the Response message may additionally indicate whether a device to device and/or device to network relay (or just a relay) will/could be performed. In this example, the Response message could indicate a device-to-device relay will/could be performed.

At step 6, UEs 392 and 603 forward over respective sidelinks the Communication Request message from the source UE 601. In this example, this step is performed after the UEs 392 and 603 determine that performing device to device relaying is supported/needed/requested and the UEs accept the relaying role. The UEs 392 and 603 can forward the Communication Request message by broadcast communication. In other examples, the UEs 392 and 603 are aware of UE 602 and so relay the Communication Request message by unicast communication.

At step 7, the target UE 602 sends a Communication Accept Response message to the relay UE if it accepts the requested communication from the source UE 601. By this, a device-device communication link is established between the target UE 602 and the relay UE. The Communication Accept Response message might be a D2D Accept Response message, e.g. a PC5 Accept Response message. The target UE 602 may select a communication path to send the Communication Accept Response message if it receives the same Communication Request message over multiple paths via multiple relay UEs. In this example, the target UE 602 receives the Communication Request message from both UEs 392 and 603, and selects UE 392 as the relay UE. It therefore sends the Accept Response message to UE 392.

At step 8, the relay UE (UE 392 in this example) forwards the Communication Accept Response message to the source UE 601. By sending this message, a D2D communication link is established between the relay UE 392 and the source UE 601 (if one is not previously established at step 3). Furthermore, the end to end multi-hop connection between the source device 601 and target device 602 could be established over the established per-hop links, i.e. the established single-hop links.

Following the completion of the process shown in FIG. 9, a D2D link is set up between UE 601 and UE 392, between UE 392 and UE 602, and an end-to-end connection is also set up between UE 601 and UE 602. In some implementations, a PC5 context is set up per 'hop', or link, i.e. between UE 601 and UE 392, between UE 392 and UE 602 and end-to-end between UE 601 and UE 602. In addition, in some implementations, a PC5-RRC context is set up per 'hop' or link, but with different uses:

AS configuration and PC5 capability is a per hop or per-link matter.

End-to-end PC5-RRC signaling/context is for end to end bearer set up.

In some examples, the target UE 602 can indicate other available communication paths in the multi-hop sidelink network to the source UE 601 via signaling over the established end-to-end connection. That is, the target UE 602 can indicate other relay UEs to the source UE 601. For example, in this case, the target UE 602 might indicate the relay UE 603.

At step 9, service data can be sent and/or received between the source UE 601 and target UE 602 over the multi-hop device to device sidelink relay following establishment of the end-to-end multi-hop connection.

Figure 10:
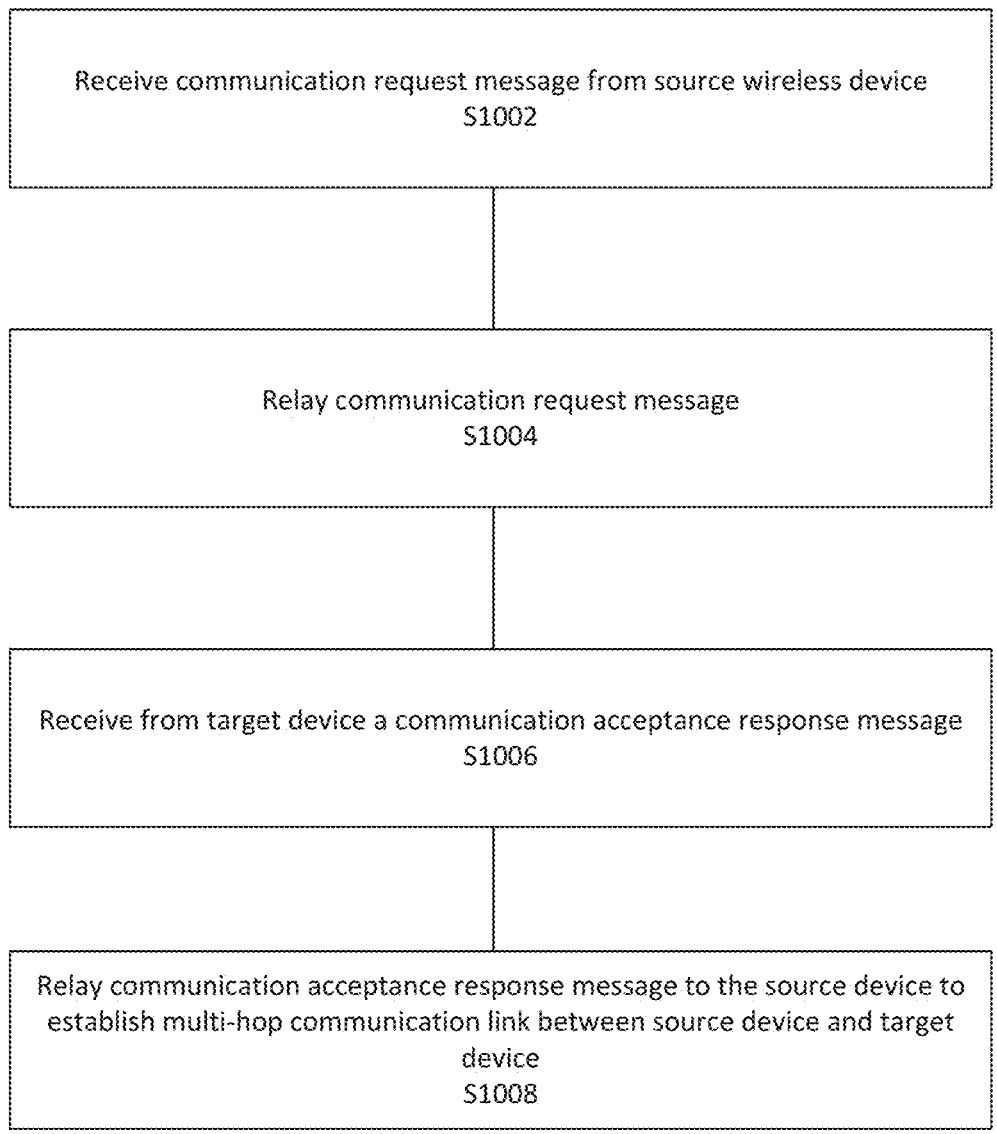
FIG. 10 is a flowchart of example steps performed by a wireless device in a connection establishment procedure for a multi-hop device to device sidelink relay.

FIG. 10 shows a flowchart summarizing steps performed by the relay UE 392 in establishing connections via. a device-to-device relay according to embodiments of the present disclosure.

At S1002, the UE 392 receives a Communication Request message from source wireless device 501. This corresponds to step 3 described above.

At S1004, the UE 392 relays the Communication Request message. The Communication Request message might be relayed by broadcast communication. In other examples, it might be relayed by unicast transmission, for example if the UE 392 is aware of (e.g. has a communication link with) the target UE 602. This corresponds to step 6 described above with respect to FIG. 9. In some examples, the UE 392 may send a Communication Accept Response message to the source UE 601 prior to relaying the Communication Request message. This enables a communication link between the source UE 601 and relay UE 392 to be established in advance of the UE 392 receiving the Communication Accept Response message from the target UE 602. In other examples, the UE 392 may hold off from sending the Communication Accept Response message until it receives a Response message from the target UE 602.

At Step 1006, the UE 392 receives a Communication Accept Response message from the target UE 602. The target UE 602 sends this Response message after receiving the broadcast from the UE 392 relaying the Communication Request message. This step corresponds to Step 7 described above with respect to FIG. 9.

At Step 1008, the relay UE 392 forwards the Communication Accept Response message received from the target UE 602 to the source UE 601. This establishes the end-to-end multi-hop connection between the source UE 601 and the target UE 602. The UE 392 may forward the Communication Accept Response message over a sidelink. It may be sent by unicast communication. Step 1008 corresponds to step 8 described for FIG. 9.

Having described example link establishment protocols for multi-hop sidelink networks, example link re-establishment protocols will now be described.

Link Re-Establishment

Example processes and protocols for performing radio link recovery in a sidelink multihop network will now be described. Examples will be described for a wireless device to network node relay as shown in FIG. 5 and a wireless device to wireless device relay as shown in FIG. 6.

Figure 11:
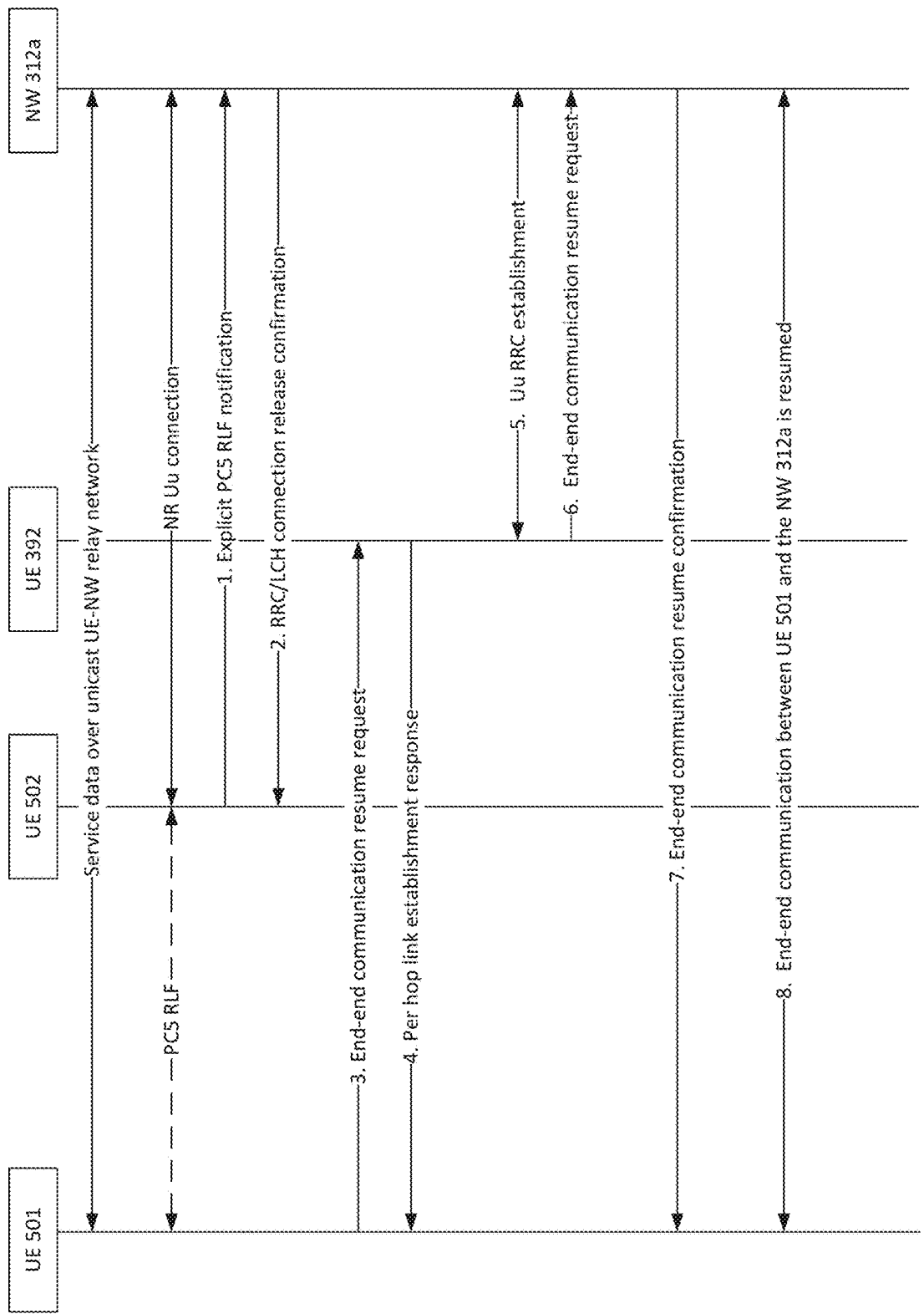
FIG. 11 illustrates an example connection recovery procedure in a multi-hop wireless device to network node sidelink relay.

FIG. 11 illustrates an example process for communication connection recovery between wireless devices of a multi-hop sidelink network. In this example, the sidelink network is the network 500 illustrated in FIG. 5. The process illustrated is for the re-establishment of unicast connections between UE 501 and network node 312a for the wireless device to network node sidelink relay. UE 501 might therefore be referred to as a source device, or remote device. UEs 392 and 502 might be referred to as relay devices.

Initially, there is an end-to-end communication connection between UE 501 and network node 312a over a multi-hop wireless device to network node relay via UE 502.

UE 501 detects radio link failure (RLF) on the D2D link towards UE 502 during the radio link management (RLM) process. In response, UE 501 releases the access stratum (AS) and non-access stratum (NAS) configurations of the hop between UE 501 and UE 502, but it keeps the end-to-end NAS and AS configuration between UE 501 and the network node 312a. UE 501 then initializes the radio link recovery procedure by sending a communication resume message (over SL), described in step 3 below.

The UE 502 also detects RLF during the RLM process. UE 502 releases the AS and NAS configurations of the hop between UE 501 and UE 502.

At step 1, when UE 502 detects RLF only on the D2D (e.g. PC5) link towards UE 501, it releases the AS and NAS configurations of that hop and notifies the network node 312a about that RLF, optionally together with information on which Uu logical channel (LCH)(s) or bearer(s) are used to carry the traffic between UE 501 and the network node 312a.

At step 2, the network node 312a can, in response to receiving the RLF from UE 502 send UE 502 to an idle/inactive mode, or release the Uu LCH(s)/bearer(s) used to carry the traffic between UE 501 and the network node 312a. The network node 312a can also send a Uu RRC connection/LCH(s)/bearer(s) release confirmation to UE 502 to release the connection/LCH(s)/bearer(s) between UE 502 and the network node 312a. The network node 312a also keeps the end-to-end NAS and AS configuration between UE 501 and the network node 312a At step 3, UE 501 sends an end-end Communication Resume Request message. If there are other available candidate communication path(s) to the network node 312a, UE 501 could first try to resume the end-end communication connection from one of the candidate paths towards the network node. In this case, the Communication Resume Request may be sent in a unicast manner towards a specific UE, e.g. UE 392 in this example. If there are multiple available paths towards the network node 312a (i.e. multiple relay UEs available), UE 501 may prioritize the paths/relay UEs based on some (pre)configured rules. e.g. prioritizing the paths/relay UEs that provide higher and/or more stable QoS, and/or the paths with lower traffic load, etc. If there are no other available communication paths to the network node 312a known to the source UE 501, the Communication Resume Request could be sent in a broadcast manner and searched for by the potential UEs who can act as a relay for the traffic or communications between UE 501 and network node 312a. The communication resume request message may include the following information:

An indication that the request is for radio link recovery (with another UE).

The ongoing end to end bearer(s) and/or the corresponding QoS information between source UE 501 and network node 312a. Note that, in some examples, the UE 501 may send the Communication Resume Request prior to step 1, for example if it detects RLF by itself. In these examples, the UE 501 may send the Communication Resume Request message upon detecting RLF.

At step 4 the UE 392, after receiving the end-end Communication Resume Request, may optionally send a "link establishment response" message to UE 501. Sending this message causes the D2D communication link between source UE 501 and UE 392 to be established. In some examples, the UE 392 doesn't send the Response message until it receives a response from the network node 312a (shown in Step 7). However, by sending the Response message prior to the UE 392 communicating with the network node 312a, the communication link between the UE 501 and UE 392 can be established in advance.

At step 5, the UE 392 triggers connection establishment with the network node 312a. The connection to be established with the network node might be an RRC connection. It might be a Uu RRC connection—i.e., a connection over the Uu interface—for example an NR Uu RRC connection. The UE 392 may perform this step if it is not currently connected to the network node 312a, for example because it is in an RRC idle/inactive/low powered mode. It is noted step 5 need not be performed if the UE 392 is already connected to the network node 312a (e.g. in an RRC connected mode) when it receives the Communication Resume Request message from the source UE 501.

After establishment of the Uu connection between the UE 392 and network node 312a, at step 6 the UE 392 sends to the network node a "end-end communication resume request" message, e.g. using RRC signaling. The UE 392 may generate the end-end communication resume request message based on the Communication Resume Request message received from the source UE 501.

At step 7, the network node 312a sends an "end-end communication resume confirmation" message to UE 392. This message may be sent via RRC signaling. Based on this received message, the UE 392 generates a resume communication confirmation message and sends it to the source UE 501. The UE 392 may send this message to UE 501 over the D2D interface, e.g. the PC5 interface. It may be sent over the sidelink. It may be sent as a unicast transmission. Upon the UE 501 receiving the confirmation message from UE 392, the 'per-hop' communication link between UE 392 and UE 501 is established (if this link is not established at step 4 above). Furthermore, the end-to-end multi-hop communication connection between UE 501 and network node 312a is re-established through a new multi-hop UE-to-network node relay. That is, the end-to-end communication connection is resumed through relay UE 392 (step 8).

In some examples, the network node serving UE 392 is different from the network node serving UE 502. In this case, the network node serving UE 392 may fetch context information for UE 501 from the network node serving UE 502. In other words, the network node serving the new relay UE (UE 392 in this example) retrieves context information for the source UE 501 from the network node serving the previous relay UE (UE 502 in this example). Upon fetching this context information, the end-to-end communication connection between UE 501 and a network node is resumed.

Figure 12:
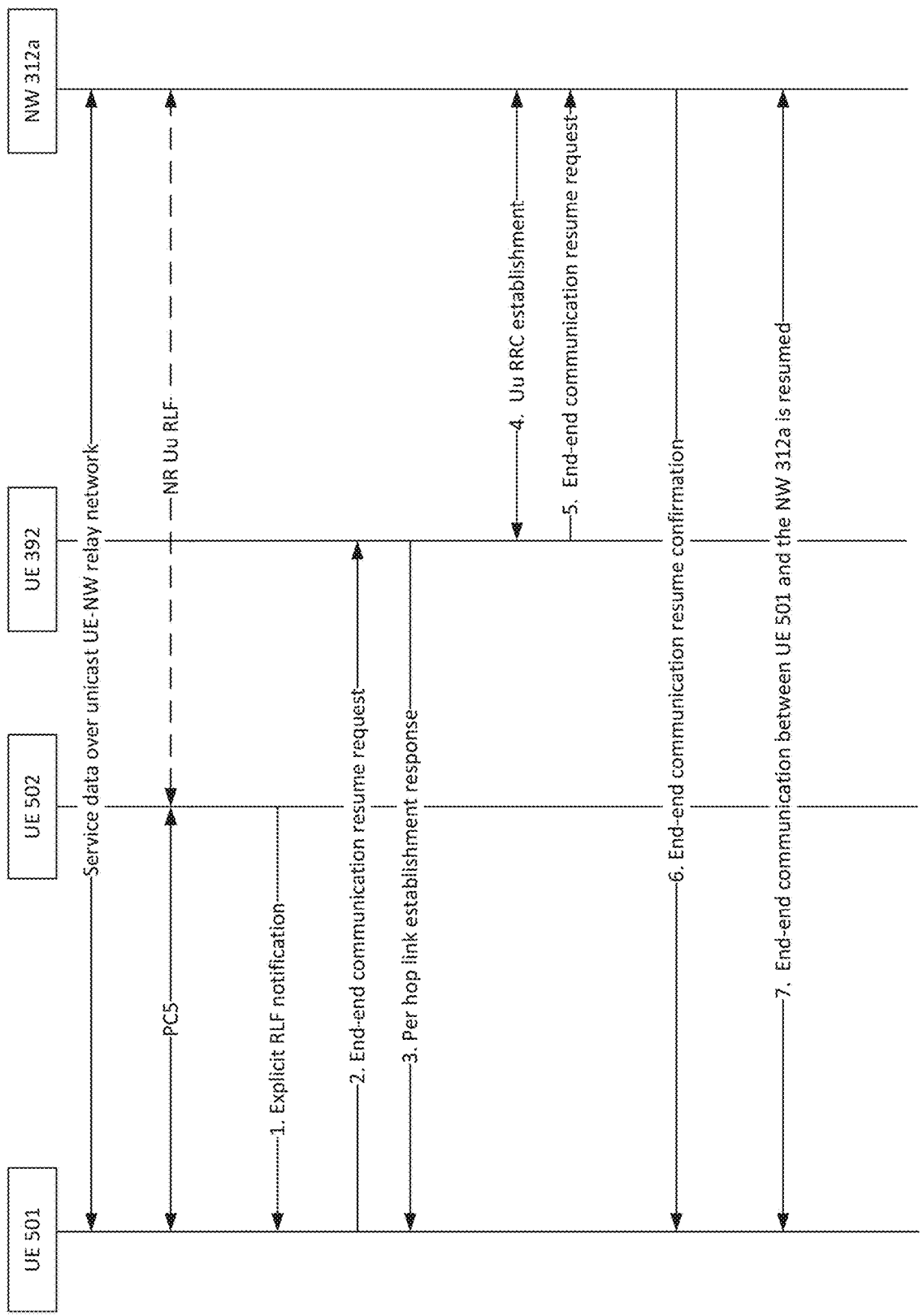
FIG. 12 illustrates a further example connection recovery procedure in a multi-hop wireless device to network sidelink relay.

FIG. 12 shows a radio link recovery procedure for a different link failure scenario within a multi-hop sidelink network. In this example the sidelink network is again the network 500 shown in FIG. 5. Initially, an end-to-end multi-hop communication connection exists between UE 501 and network node 312a via relay UE 502.

In this example, the radio link failure (RLF) happens between UE 502 and network node 312a (indicated by the dashed line in FIG. 12). The radio link recovery procedures are similar to those described above with respect to FIG. 11. When UE 502 detects RLF only on the communication link towards the network node 312a (e.g. on the Uu interface towards the network node 312a), it may first try to recover the Uu link. If that is not successful, the UE 502 enters an idle/inactive/low powered mode and may send a RLF failure notification message to the UE 501. This is shown at step 1. Both UE 501 and UE 502 may then release the link of that hop (i.e., release the D2D link between UE 501 and UE 502), or just release the per-hop LCH(s)/bearer(s) between the two UEs where the LCH(s)/bearer(s) are used to carry the end to end traffic in communications between UE 501 and the network node 312a. This explicit RLF info may also trigger UE 501 to start the end to end communication resume procedure (step 2). The rest of steps are similar to those described above for FIG. 11. In other words, steps 2 to 7 in FIG. 12 are similar to steps 3 to 8 respectively in FIG. 11.

Figure 13:
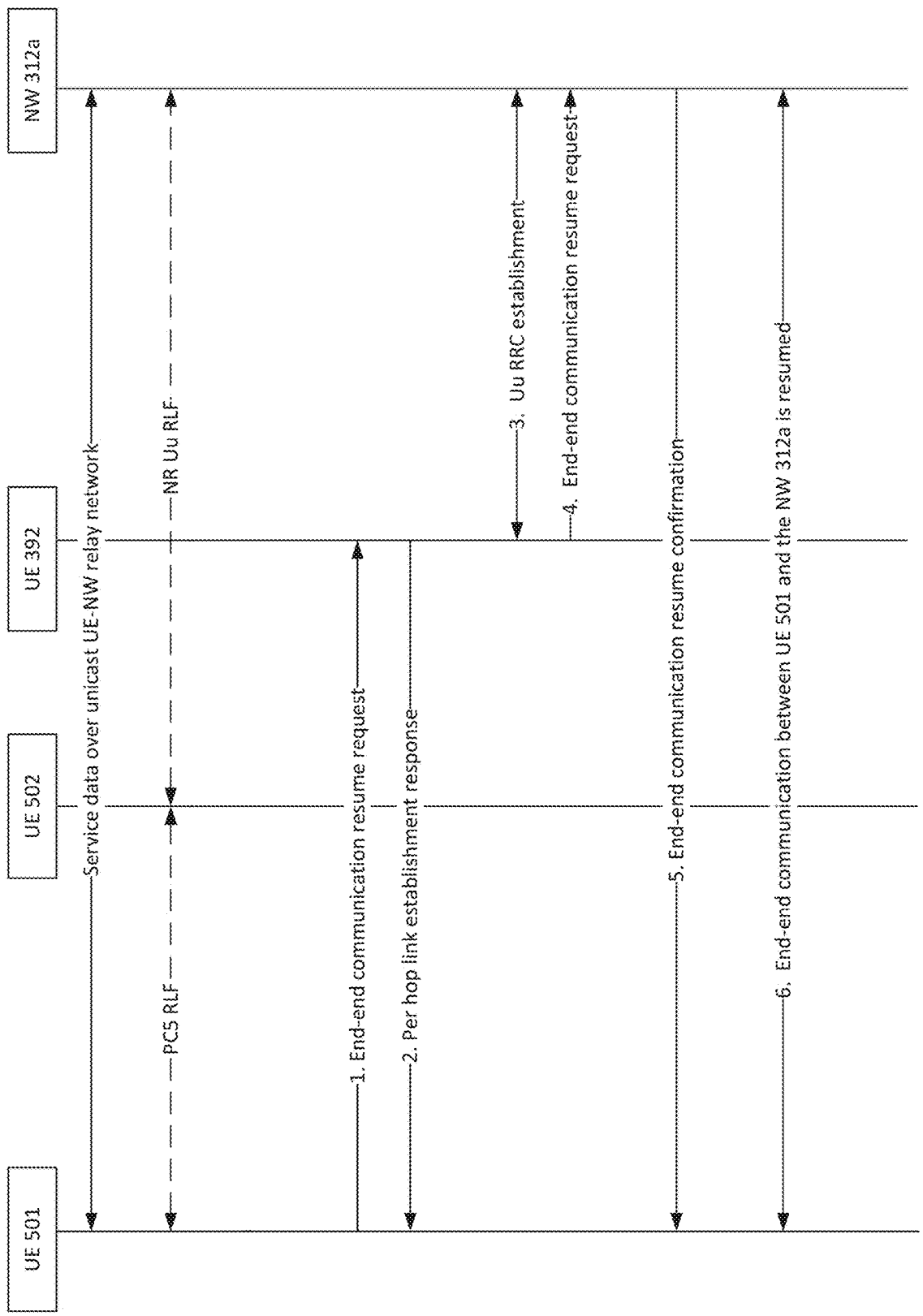
FIG. 13 illustrates a further example connection recovery procedure in a multi-hop wireless device to network sidelink relay.

FIG. 13 shows a radio link recovery procedure for a different link failure scenario within a multi-hop sidelink network. In this example the sidelink network is again the network 500 shown in FIG. 5. Initially, an end-to-end multi-hop communication connection exists between UE 501 and network node 312a via relay UE 502.

In this example, the radio link failure (RLF) happens between UE 501 and UE 502 and between UE 502 and network node 312a (indicated by the dashed lines in FIG. 13). More specifically, in the example illustrated, RLF occurs in both the PC5 link between UE 501 and UE 502, and in the Uu link between the UE 502 and network node 312a.

When the UE 502 detects RLF on both the communication link with the UE 501 and the communication link with the network node 312a, the UE 502 releases the AS and NAS configurations of the link between UE 501 and UE 502, and goes into an idle/inactive/low powered mode in the Uu link. The UE 501 directly starts the end-end communication resume procedures from step 1 to step 6 similar to FIGS. 11 and 12 described above. That is, steps 1 to 6 in FIG. 13 are analogous to steps 3 to 8 respectively in FIG. 11 and steps 2 to 7 respectively in FIG. 12.

Figure 14:
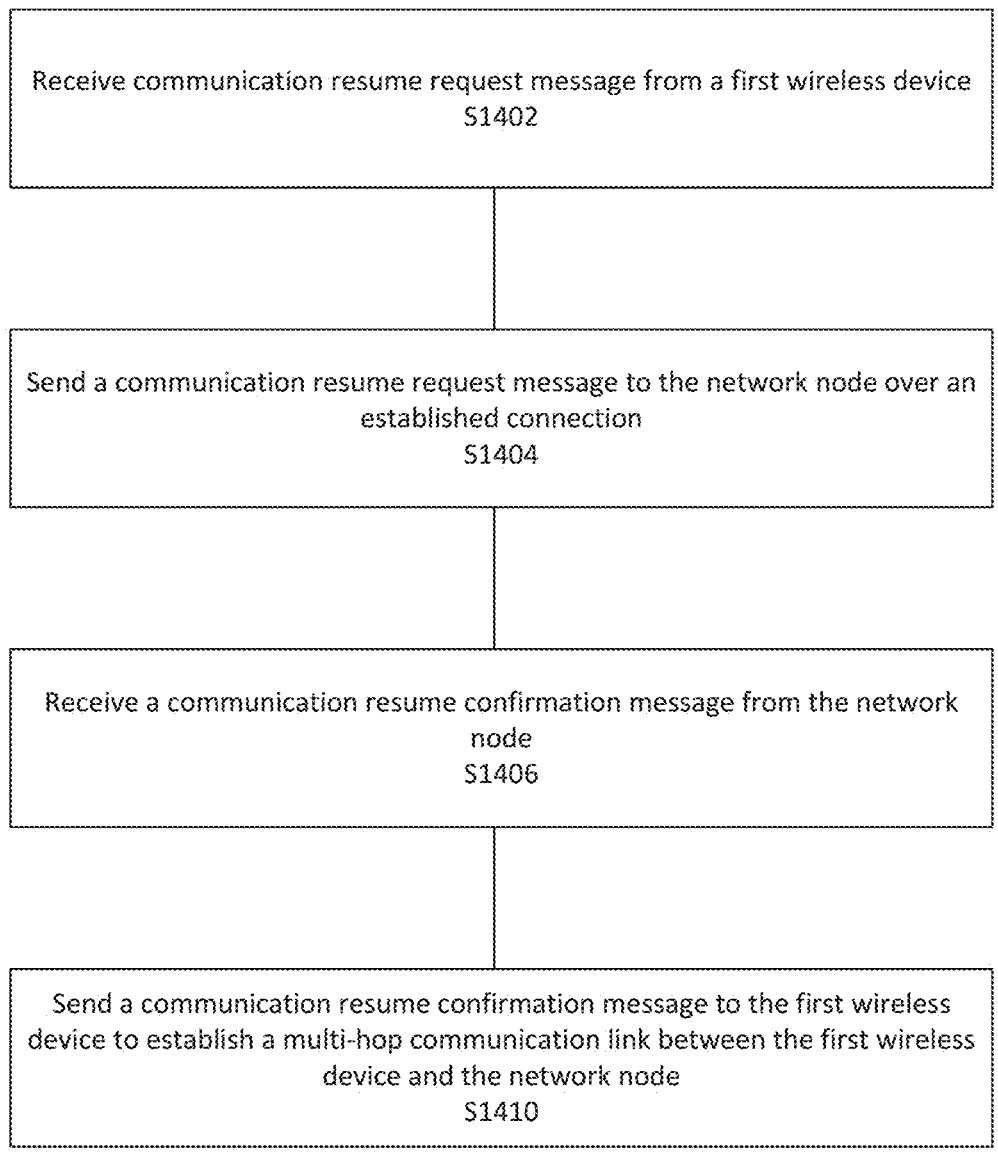
FIG. 14 is a flowchart of steps performed by a wireless device in a connection recovery procedure for a multi-hop device to network sidelink relay.

FIG. 14 shows a flowchart summarizing the steps that might be performed by a wireless device (e.g. relay UE 392) during radio link recovery procedures, for example the procedures described above with respect to FIGS. 11 to 13. For clarity, the wireless device at which these steps are performed may be referred to as a relay wireless device. The relay wireless device can perform the steps of FIG. 14 to re-establish an end-to-end communication connection between the first wireless device and a network when at least one communication link failure has occurred over a multi-hop relay between the first wireless device and the network.

At step S1402, the relay wireless device receives a communication resume request message from a first wireless device. In the examples described above with reference to FIGS. 11 to 13, the first wireless device is UE 501. This step can correspond to step 3 of FIG. 12, step 2 of FIG. 13 or step 1 of FIG. 13.

At step 1404, the relay wireless device sends an end-end communication resume request message for the first wireless device to a network node (e.g. network node 312a) over an established connection. The relay wireless device can generate this message from the communication resume request message received from the first wireless device at step S1402. The wireless device may send the communication resume request message to the network node through RRC signaling. In other words, the established connection between the wireless device and network node may be an RRC connection. If the wireless device does not have an active connection to the network node at the time it receives the communication resume request message from the first wireless device, for example because it's in an idle/inactive/low-powered mode, the wireless device may trigger establishment of the connection to the network node prior to performing step S1402. This is described above for step 5 in FIG. 11; step 4 in FIG. 12 and step 3 in FIG. 13. Step 1404 can correspond to step 6 of FIG. 11; step 5 of FIG. 12 and step 6 of FIG. 13.

In some examples, the relay wireless device might send a communication resume request response message to the first wireless device in response to receiving the communication request message at S1402. This step can be performed before the relay wireless device initiates connection establishment with the network, and thus before the relay wireless device receives any response message from the network. This is illustrated at step 4 in FIG. 11; step 3 in FIG. 12 and step 2 in FIG. 13. This step causes a D2D (e.g. PC5) link to be established between the relay wireless device and the first wireless device.

At step S1406, the relay wireless device receives a communication resume confirmation message from the network node. This message is received in response to the relay wireless device sending the communication resume request message at step 1404. This response message might be received through RRC signaling.

At S1408, the relay wireless device sends a communication resume confirmation message to the first wireless device. The relay wireless device may generate this message from the communication resume confirmation message received from the network node at S1406. Steps S1406 and S1408 can correspond to step 7 in FIG. 11; step 6 in FIG. 12 and step 5 in FIG. 13. Following the completion of S1408, a D2D communication link is established between the relay wireless device and first wireless device (if this has not been established in advance). Moreover, an end-to-end multi-hop communication connection is reestablished between the first wireless device and network node through a new multi-hop relay via the relay wireless device. This can correspond to step 8 of FIG. 11, step 7 of FIG. 12 and step 6 of FIG. 13.

Figure 15:
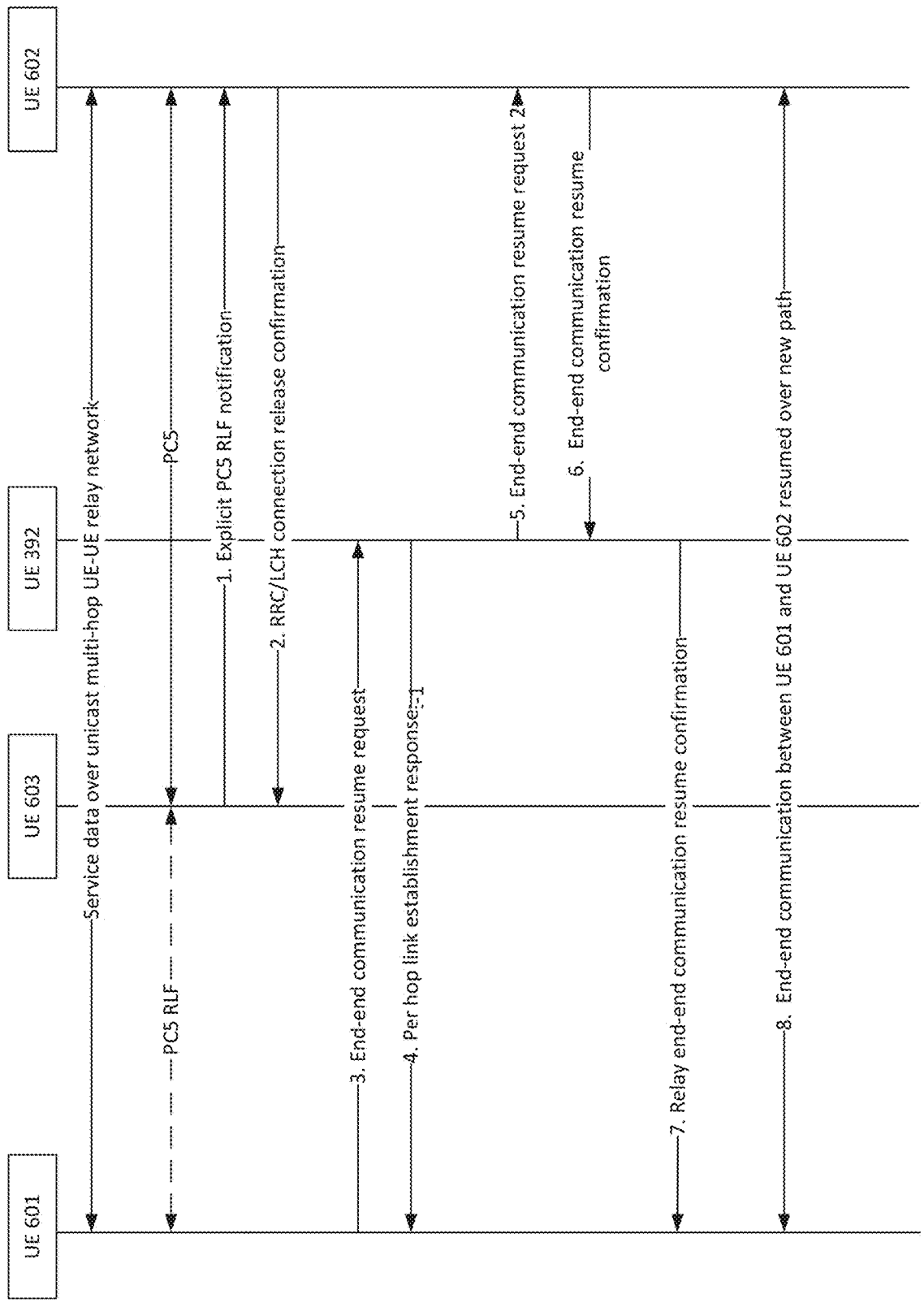
FIG. 15 illustrates an example connection recovery procedure in a multi-hop wireless device to wireless device sidelink relay.

FIG. 15 illustrates an example process for reestablishing a communication connection between wireless devices of a multi-hop sidelink network. In this example, the sidelink network is the network 600 illustrated in FIG. 6. The processes illustrated are for the reestablishment of unicast connections between UE 601 and UE 602 for a device to device sidelink relay.

Initially, UE 601 detects radio link failure (RLF) during the radio link management (RLM) process. UE 601 may detect, for example: poor link quality, no data or HARQ/ARQ feedback received for a certain time, etc. The consequent behavior of UE 601 depends on whether UE to UE relay is supported/enabled or not.

If UE to UE relay is supported/enabled by both UE 601 and UE 602, and furthermore UE 601 is currently communicating with UE 602 via. a relay UE (e.g. UE 603):

UE 601 releases the AS and NAS configurations of the hop/D2D communication link between UE 601 and UE 603, but it keeps the end-to-end NAS and AS configuration (the end to end AS configuration primarily includes e.g. the bearer/QoS configuration) between UE 601 and UE 602 for a (pre)defined time period. UE 601 then (in Step 3 described below) initializes the radio link recovery procedure by sending a communication resume message either in a broadcast manner or unicast manner (if there is alternative connection exist).

Alternatively, if UE to UE relay is supported/enabled by both UE 601 and UE 602 and UE 601 is directly communicating with UE 602 (i.e. not via a relay UE):

UE 601 keeps the end-to-end NAS and AS configuration between UE 601 and UE 602 for a (pre)defined time period and (in Step 3) initializes the radio link recovery procedure by sending a communication resume message.

The information on whether or not UE to UE relay is supported/enabled could be exchanged between the UEs during or after D2D (e.g. PC5) link establishment, and the information could be stored in a UE context (e.g. the PC5 context).

The following steps assume UE to UE relay is supported/enabled by both UE 601 and UE 602, and UE 601 is currently communicating with UE 602 via. a relay UE 603.

At step 1, RLF is only detected on one of the two hops in the relay (in this example, the hop between UE 601 and UE 603 in FIG. 6). UE 603 may inform UE 602 of the RLF over the other hop. The UE's of the other hop that hasn't suffered RLF (UEs 603 and 602 in this example) may also release the link of that hop, or just release the per-hop LCH(s)/bearer(s) between UE 602 and UE 603 that are used to carry the end to end traffic for communications between UE 601 and UE 602, while UE 602 may keep the end-to-end NAS and AS configuration (the end to end AS configuration primarily includes e.g. the bearer/QoS configuration) between UE 601 and UE 602 for a (pre)defined time period.

If an explicit RLF message is sent to UE 602, then at step 2 UE 602 may release the per hop (between UE 603 and UE 602) link or LCH(s)/bearer(s) that are used to carry the end to end traffic between UE 601 and UE 602 and send a release confirmation to UE 603.

At step 3, UE 601 sends an end-end communication resume request message. If there are other available candidate communication path(s) to UE 602, UE 601 could first try to resume communication using one of the candidate paths towards the destination UE 602. In this case, the communication resume request message may be sent in a unicast manner towards a specific UE (UE 392 in this case). If there are multiple other available communication paths towards the destination UE 602, UE 601 may prioritize the paths based on some (pre)configured rules. e.g. prioritizing the communication paths that provide higher and/or more stable QoS, and/or the paths with lower traffic load, etc. If there are no available other communication paths to the destination UE 602 known to source UE 601, the communication resume request could be sent in a broadcast manner by UE 601 and searched for by potential UEs who can act as a relay for the communications between UE 601 and UE 602. In the example shown here, the communication resume request message sent by UE 601 (either by unicast or broadcast) is received by UE 392.

Note that UE 601 may send the communication resume request prior to step 1 if it detects RLF by itself.

The communication resume request message initiates the link reestablishment procedure. The communication resume request message may include the following information:

An indication that the request is for radio link recovery (with another UE).

The ongoing end to end bearer(s) and/or the corresponding QoS information between UE 601 and UE 602.

The AS layer (e.g. layer 2) ID of the source UE (e.g. UE 601 in this case) and the destination UE (e.g. UE 602 in this case).

At step 4, the UE 392 optionally sends a "link establishment response" message to UE 601 after receiving the resume request message at step 3. The response message may be sent over the sidelink between the UE 392 and UE 601. By sending this response message, the D2D (e.g. PC5) link between UE 601 and UE 392 is established. In other examples, step 4 is not performed (i.e. the UE 392 does not send a link establishment response message at this stage).

At step 5, UE 392 relays the end-end communication resume request message from UE 601 to target UE 602. The UE 392 can forward the request message in a unicast manner if there is already a D2D link established between UE 392 and UE 602, otherwise the request can be forwarded in a broadcast manner transmission.

At step 6 UE 602 sends a "communication resume confirmation" message to UE 392. By receiving this confirmation, the per-hop link (that is, D2D communication link) between UE 392 and UE 602 is also established if there is no link between the UEs established yet. The confirmation message may be sent in a unicast transmission. It may be sent over the sidelink between the UEs 602 and 392.

At step 7, UE 392 relays the end-end communication resume confirmation from target UE 602 to source UE 601. By receiving this confirmation, the per-hop (that is, D2D) communication link between UE 392 and UE 601 is also established if the link is not established yet (for example, if step 4 is not performed). The end-to-end multi-hop communication connection between UEs 601 and 602 is then resumed via relay UE 392. The end-to-end communication connection may be resumed automatically, that is there is no need to reestablish the end to end connection as the end to end context is still there from the previous end-to-end communication via relay 603.

Figure 16:
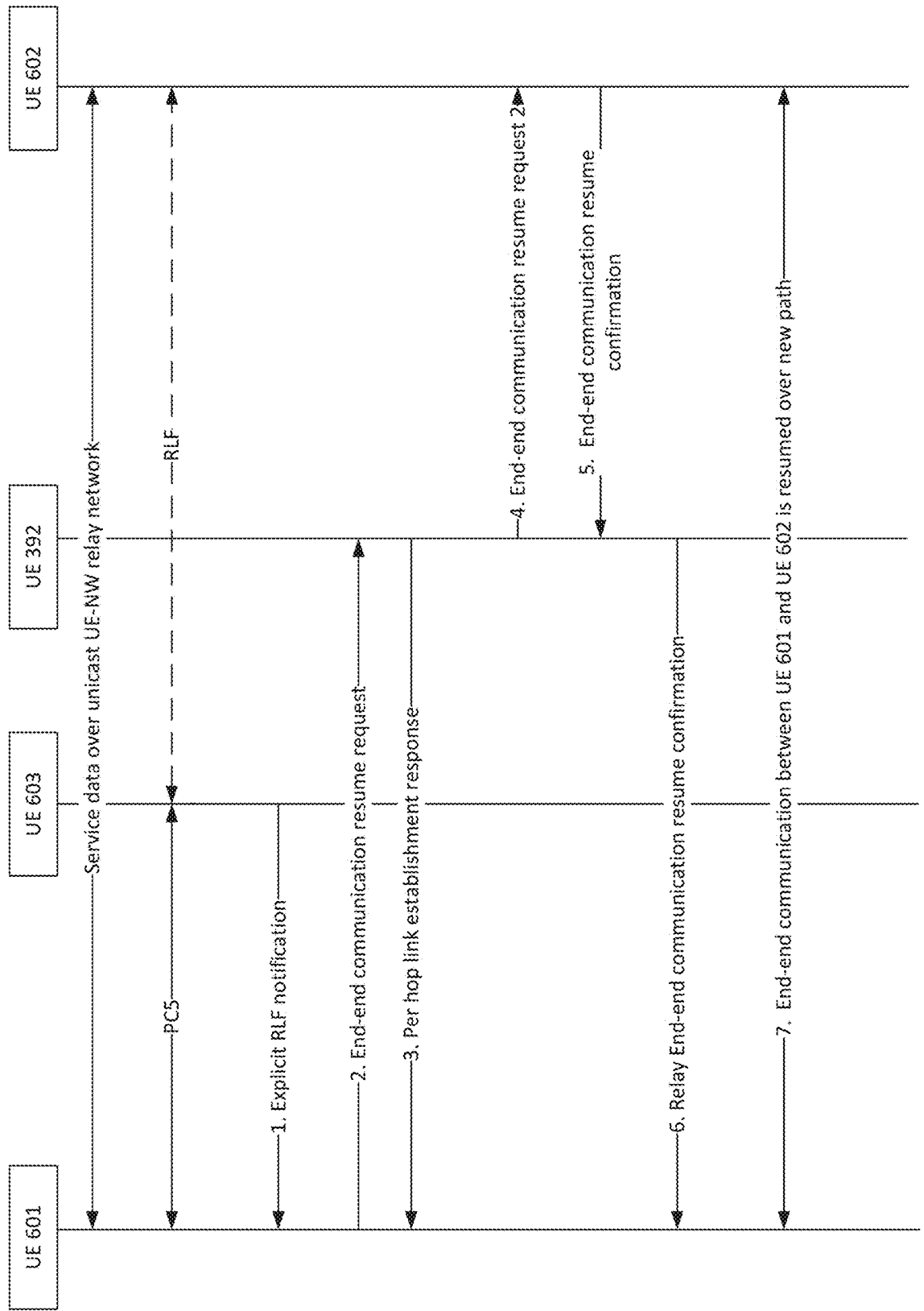
FIG. 16 illustrates a further example connection recovery procedure in a multi-hop wireless device to wireless device sidelink relay.

FIG. 16 shows a radio link recovery procedure for a different link failure scenario within a multi-hop sidelink network. In this example the sidelink network is again the network 600 shown in FIG. 6. Initially, an end-to-end multi-hop communication link exists between UE 601 and UE 602 via relay UE 603.

In this example, the radio link failure (RLF) happens between UE 603 and UE 602, indicated by the dashed lines. The radio link recovery procedures are similar to FIG. 15 except that in step 1, upon detecting RLF, UE 603 sends an explicit RLF notification to UE 601. The explicit RLF notification triggers UE 601 to start the end-end communication resume procedure. The rest of steps are similar to those described above for FIG. 15. In other words, steps 2 to 7 in FIG. 16 are similar to steps 3 to 8 respectively in FIG. 15.

Figure 17:
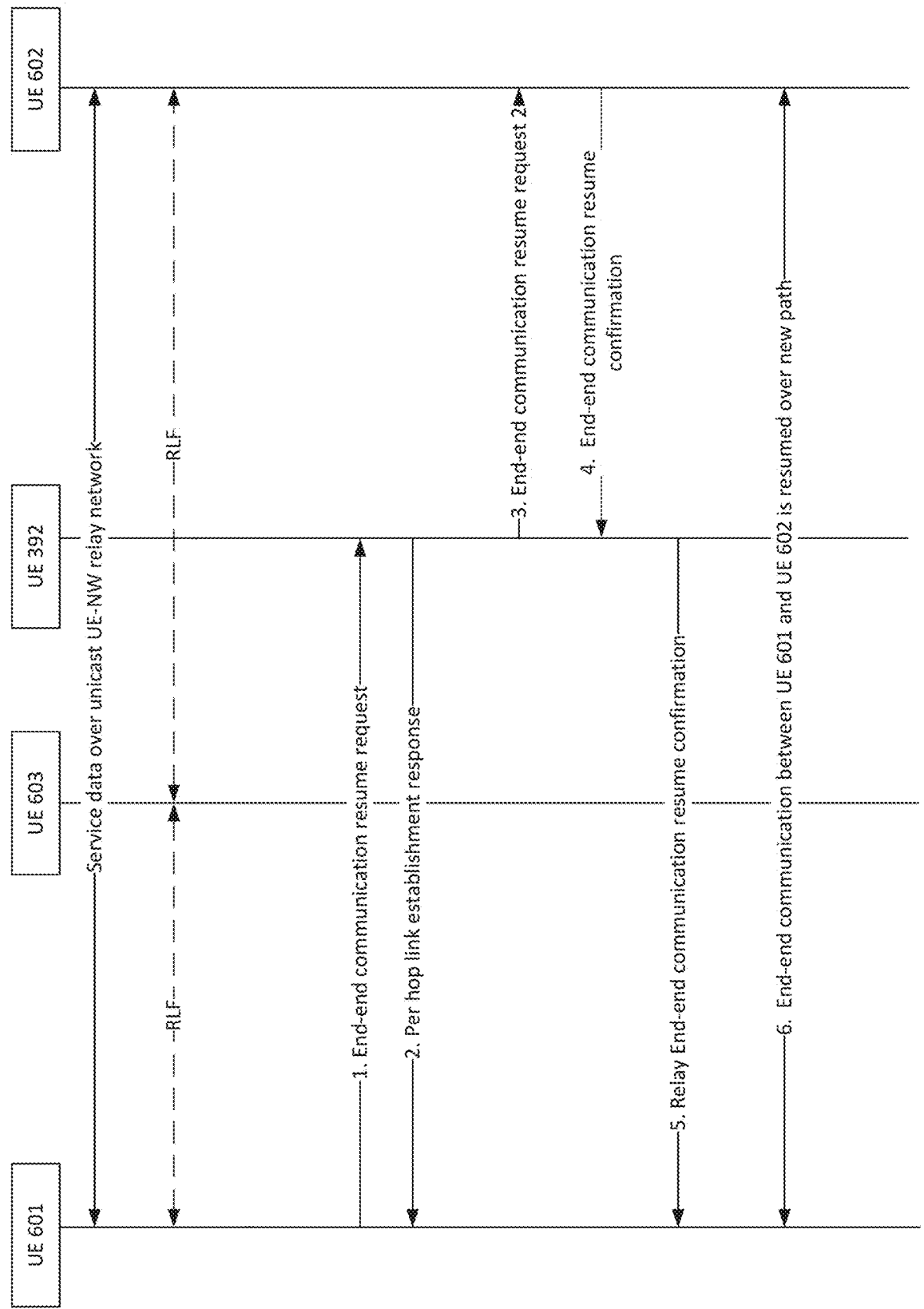
FIG. 17 illustrates a further example connection recovery procedure in a multi-hop wireless device to wireless device sidelink relay.

FIG. 17 shows a radio link recovery procedure for a different link failure scenario within a multi-hop sidelink network. In this example the sidelink network is again the network 600 shown in FIG. 6. Initially, an end-to-end multi-hop communication link exists between UE 601 and UE 602 via relay UE 603.

In this example, radio link failure (RLF) is detected on two hops of the device to device relay—that is, on the D2D communication link between UE 601 and UE 603, and the D2D communication link between UE 603 and UE 602. UE 603 releases the AS and NAS configurations of the hop/communication link between UE 603 and UE 602 as well as the hop/communication link between UE 603 and UE 601, while both UE 601 and UE 602 keep the end-to-end NAS and AS configuration between the two UEs for a (pre) defined time period. The end to end AS configuration can include e.g. the bearer/QoS configuration.

The radio link recovery procedures from Step 1 to Step 6 are similar to those described above for FIGS. 15 and 16. In other words, steps 1 to 6 in FIG. 17 are similar to steps 3 to 8 in FIG. 15 and steps 2 to 7 in FIG. 16.

Figure 18:
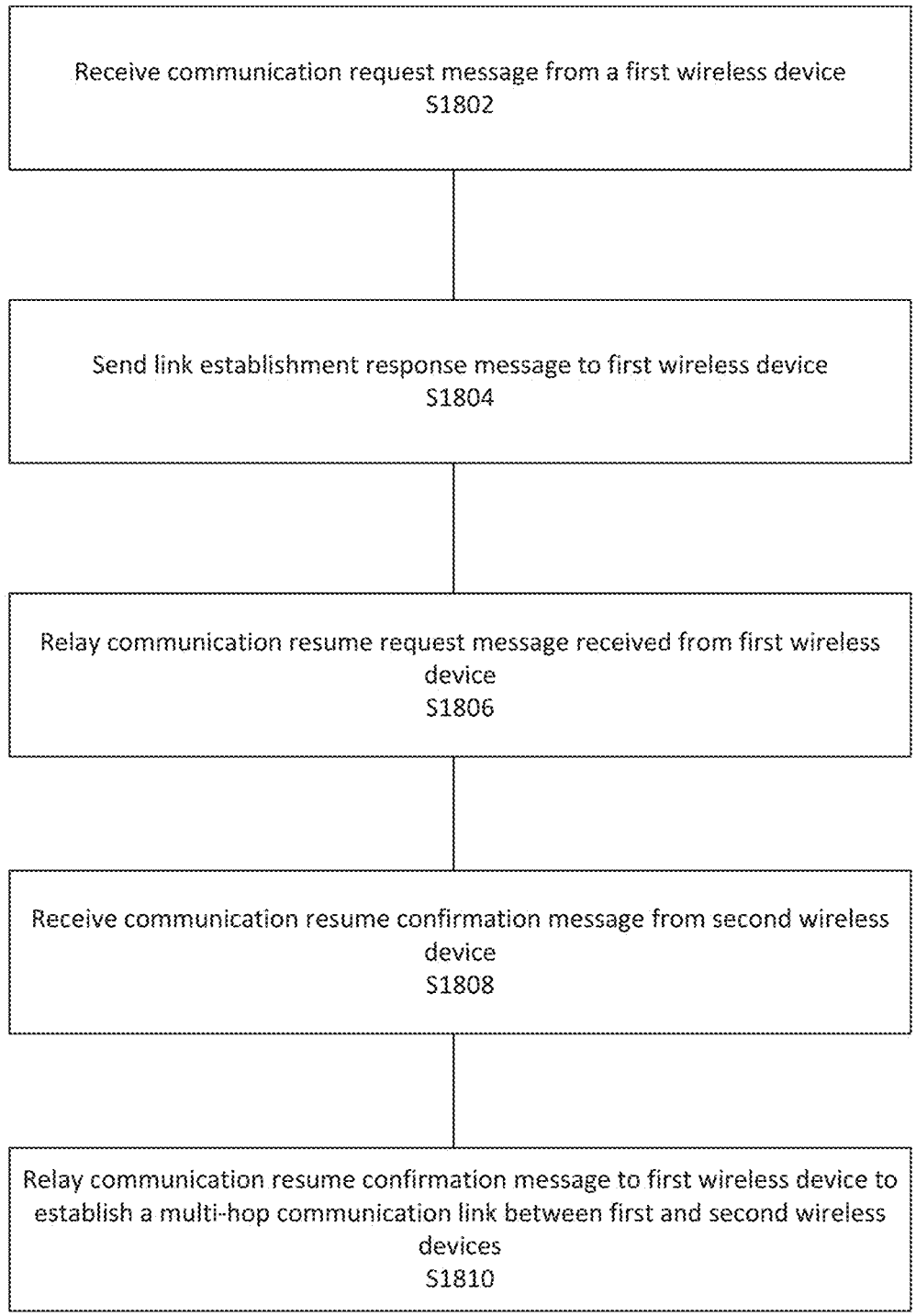
FIG. 18 is a flowchart of steps performed by a wireless device in a connection recovery procedure for a multi-hop device to device sidelink relay.

FIG. 18 shows a flowchart summarizing the steps that might be performed by a wireless device (e.g. relay UE 392) during radio link recovery procedures, for example the procedures described above with respect to FIGS. 15 to 17. For clarity, the wireless device at which these steps are performed may be referred to as a relay wireless device. The relay wireless device can perform the steps of FIG. 18 to re-establish an end-to-end communication connection between the first wireless device and a second wireless device when at least one communication link failure has occurred over a multi-hop relay between the first wireless device and the second wireless device. In the examples described above with reference to FIGS. 15 to 17, the wireless device at which the steps are performed is UE 392, the first wireless device is UE 601 and the second wireless device is UE 602.

At step S1802, the relay wireless device receives a communication request message from a first wireless device. This step can correspond to step 3 in FIG. 15, step 2 in FIG. 16 and step 1 in FIG. 17.

At step S1804, the relay device optionally sends a link establishment response message back to the first wireless device. This step can correspond to step 4 in FIG. 15, step 3 in FIG. 16 and step 2 in FIG. 17. In some examples, this step is omitted.

At step S1806, the relay device relays the communication resume request message received from the first wireless device. The relay device may forward the communication resume request message through a broadcast or unicast transmission. This step can correspond to step 5 of FIG. 15, step 4 of FIG. 16 or step 3 of FIG. 17.

At step S1808, the relay device receives a communication resume confirmation message from a second wireless device. The second wireless device is a device that received the communication resume request message forwarded by the relay device at step S1806 through broadcast or unicast transmission. S1808 can cause a D2D (e.g. PC5) communication link to be established between the relay wireless device and second wireless device if not already established. S1808 can correspond to step 6 in FIG. 15, step 5 in FIG. 14 or step 4 in FIG. 17.

At step S1810 the relay wireless device relays the communication resume confirmation message received from the second wireless device to the first wireless device. The confirmation message may be relayed to the first wireless device by unicast transmission. It may be relayed over a D2D link between the devices. By forwarding the confirmation message to the first wireless device a D2D communication link is established between the relay wireless device and the first wireless device, if one is not already established (e.g. if step S1804 is not performed). Furthermore, an end-to-end multi-hop communication connection is reestablished between the first wireless device and the second wireless device. The end-to-end communication connection is reestablished through a multi-hop device to device relay that includes the relay wireless device. Step S1810 can correspond to steps 7 and 8 of FIG. 15; steps 6 and 7 of FIG. 16 and step 5 and 6 of FIG. 17.

The embodiments described herein provide methods and protocols for connection establishment and reestablishment over a multi-hop relay in an efficient manner. The multi-hop relay may be a device to device relay or a device to network node relay. In some examples, a wireless device might be capable of acting as a relay device within both a device to device relay and a device to network relay. An example of such a wireless device is wireless device 392 in FIG. 6, which can act as relay for the device to device relay between UE 601 and UE 602, and as a relay for the device to network relay between UE 601 and network node 312*a*. In other words, the features of the present disclosure enable the efficient coexistence of a device to device relay and a device to network relay. Put another way, a wireless device such as device 392 in FIG. 6, can concurrently implement the methods and protocols described with respect to FIGS. 7 to 10 for connection establishment for device to device and device to network relays; and can concurrently implement the methods and protocols described with respect to FIGS. 11 to 18 for connection reestablishment for device to device and device to network relays. The wireless device 392 can determine whether it is to act as a relay for a device to device relay and/or a device to network relay from the communication request message(s) received from source device(s). Thus, the wireless device 392 may receive a communication request message from a source device and determine from the message whether it is to act as a relay in a device to device relay or a device to network relay. If it determines it's to act a relay in a device to device relay, the protocols and methods described with respect to any of FIGS. 9, 10 and 15 to 18 may be followed. If it determines it's to act as a relay in a device to network relay, the protocols and methods described with respect to any of FIGS. 7, 8 and 11 to 14 may be followed.

The invention claimed is:

1. A method of establishing connections between wireless devices in a multi-hop sidelink communication network, the method comprising:
receiving a communication request message from a source wireless device;
transmitting a first communication acceptance response message to the source wireless device over a first sidelink channel to establish a communication link between the wireless device and the source wireless device;
subsequent to transmitting the first communication acceptance response message, relaying the communication request message over a second sidelink channel;
receiving, from a target wireless device that received the relayed communication request message, a second communication acceptance response message over the second sidelink channel to establish a communication link between the wireless device and target wireless device; and
relaying the second communication acceptance response message to the source wireless device to establish a multi-hop connection between the source wireless device and the target wireless device.

2. The method of claim 1, wherein transmitting the first communication acceptance response message comprises transmitting an indication that a wireless device to wireless device relay is to be established.

3. The method of claim 1, further comprising:
determining a device-to-device communication over more than one hop in the multi-hop sidelink communication network is requested or allowed by the source device based on the communication request message,
wherein transmitting the first communication acceptance response message to the source device comprises transmitting the first communication acceptance response message based on determining the device-to-device communication over more than one hop in the multi-hop sidelink connection network is requested or allowed by the source device.

4. The method of claim 1, wherein receiving the communication request message comprises receiving one or more of:
an indication that the source wireless device supports device-to-device communication over more than one hop in the multi-hop sidelink communication network;
an indication that the communication requested by the source device is to be performed with other one or more wireless devices over a device-to-device communication interface;
and
an indication of identifiers ("IDs") for wireless devices to be excluded for relaying communications over the multi-hop sidelink network.

5. A wireless device for establishing connections between wireless devices in a multi-hop sidelink communication network, the wireless device comprising:
processing circuitry; and
memory coupled to the processing circuitry and having instructions stored therein that are executable by the processing circuitry to cause the wireless device to perform operations comprising:
receiving a communication request message from a source wireless device, the communication request message including at least one of:
an indication of Service Information; and
an indication of a targeted service area for the communication requested by the source wireless device;
relaying the communication request message over a sidelink channel;
receiving from a target wireless device that received the relayed communication request message, a communication acceptance response message over the sidelink channel to establish a communication link between the wireless device and target wireless device; and
relaying the communication acceptance response message received from the target wireless device to the source wireless device to establish a multi-hop connection between the source wireless device and the target wireless device.

6. The wireless device of claim 5, wherein the communication acceptance response message is a second communication acceptance response message,
the operations further comprising:
transmitting a first communication acceptance response message to the source wireless device over the sidelink channel to establish a communication link between the wireless device and the source wireless device.

7. The wireless device of claim 6, the operations further comprising:
transmitting the first communication acceptance response message to the source wireless device prior to relaying the communication request message.

8. The wireless device of claim 5, the operations further comprising:
determining, from the received communication request message from the source wireless device, to perform a device to device relay; and
relaying the communication request message.

9. The wireless device of claim 5, wherein the communication request message received from the source wireless device comprises one or more of:
an indication the source wireless device supports device-to-device communication over more than one hop in the multi-hop sidelink communication network;
an indication the communication requested by the source device is to be performed with one or more other wireless devices over a device-to-device interface; and
an indication of identifiers ("IDs") for wireless devices to be excluded for relaying communications over the multi-hop sidelink network.

10. A method of operating a wireless device for establishing connections between wireless devices and a network node in a multi-hop sidelink communication network, the method comprising:
receiving a communication request message from a source wireless device;
transmitting a communication acceptance response message to the source wireless device over a sidelink channel to establish a communication link between the wireless device and the source wireless device;
subsequent to transmitting the communication acceptance response message, transmitting a connection establishment request message for the source wireless device to a network node over an established connection;
receiving from the network node a connection establishment acceptance message for the source wireless device; and
transmitting a connection establishment acceptance message for the network node to the source wireless device over the sidelink channel to establish a multi-hop connection between the source wireless device and the network node via the wireless device.

11. The method of claim 10, wherein transmitting the communication acceptance response message to the source wireless device comprises transmitting an indication that a wireless device to network relay is to be established.

12. The method of claim 10, further comprising:
determining a communication to the network over more than one hop in the multi-hop sidelink communication network is requested or allowed by the source device based on the communication request message; and
triggering establishment of the connection with the network node while the wireless device is in a low powered mode.

13. The method of claim 10, wherein receiving the connection establishment acceptance message from the network node comprises receiving an indication that the request by the source wireless device for a communication with the network has been accepted.

14. The method of claim 10, further comprising:
determining, from the received communication request message from the source wireless device, to perform a device to network relay,
wherein sending the communication request message to the network node is performed after determining to perform the device to network relay.

15. The method of claim 10, wherein receiving the communication request message comprises receiving one or more of:
an indication the source wireless device supports communication to the network through one or more wireless device to network node relays in the multi-hop sidelink communication network;
an indication the communication requested by the source device requires use of the Uu interface; and
an indication of identifiers ("IDs") for wireless devices to be excluded for relaying communications over the multi-hop sidelink network.

16. The method of claim 10, wherein the connection with the network node is a radio resource control ("RRC") connection.

17. A wireless device for establishing connections between wireless devices and a network node in a multi-hop sidelink communication network, the wireless device comprising:
processing circuitry; and
memory coupled to the processing circuitry and having instructions stored therein that are executable by the processing circuitry to cause the wireless device to perform operations comprising:
receiving a communication request message from a source wireless device over a sidelink channel, the communication request message including at least one of:
an indication of Service Information; and
an indication of a targeted service area for the communication requested by the source wireless device;
transmitting a connection establishment request message for the source wireless device to a network node over an established connection;
receiving from the network node a connection establishment acceptance message for the source wireless device; and
transmitting a connection establishment acceptance message for the network node to the source wireless device over the sidelink channel to establish a multi-hop connection between the source wireless device and the network node via the wireless device.

18. The wireless device of claim 17, the operations further comprising:
subsequent to receiving the communication request message from the source wireless device, transmitting a communication acceptance response message to the source wireless device over the sidelink channel to establish a communication link with the source wireless device.

19. The wireless device of claim 18, the operations further comprising:
transmitting the communication acceptance response message to the source wireless device prior to transmitting the connection establishment request message to the network node.

20. The wireless device of claim 18, the operations further comprising:
determining a communication to the network over more than one hop in the multi-hop sidelink communication network is requested or allowed by the source device based on the communication request message; and
triggering establishment of the connection with the network node while in a low powered mode.

21. The wireless device of claim 17, wherein the connection with the network node is a radio resource control ("RRC") connection.

22. The method of claim 1, wherein receiving the communication request message comprises receiving one or more of:
an indication of Service Information; and
an indication of a targeted service area for the communication requested by the source wireless device.

23. The method of claim 10, wherein receiving the communication request message comprises receiving one or more of:
an indication of Service Information; and
an indication of a targeted service area for the communication requested by the source wireless device.

* * * * *